(12) United States Patent
Cho et al.

(10) Patent No.: US 8,638,766 B2
(45) Date of Patent: Jan. 28, 2014

(54) ELECTRONIC DEVICE AND METHOD OF CONTROLLING THE SAME

(75) Inventors: Beomseok Cho, Seoul (KR); Seongsoo Sim, Seoul (KR); Hwangoo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 330 days.

(21) Appl. No.: 13/022,510

(22) Filed: Feb. 7, 2011

(65) Prior Publication Data
US 2011/0317675 A1    Dec. 29, 2011

(30) Foreign Application Priority Data
Jun. 28, 2010   (KR) .................. 10-2010-0061051

(51) Int. Cl.
*H04W 4/00*    (2009.01)
*G06F 15/16*    (2006.01)

(52) U.S. Cl.
USPC ............................ 370/338; 709/206; 709/217

(58) Field of Classification Search
USPC .................................. 370/338; 709/206, 217
See application file for complete search history.

(56) References Cited

U.S. PATENT DOCUMENTS

2007/0155307 A1    7/2007   Ng et al.
2009/0222422 A1    9/2009   Yoon et al.

FOREIGN PATENT DOCUMENTS

EP    1571803    9/2005

*Primary Examiner* — Asad Nawaz
*Assistant Examiner* — Stephanie Chang
(74) *Attorney, Agent, or Firm* — Lee, Hong, Degerman, Kang & Waimey

(57) ABSTRACT

The embodiments of the present invention relate to an electronic device and a method of controlling the electronic device. When a mobile terminal enters into or comes out of a network environment including a plurality of electronic devices that may communicate with each other, the electronic device and the method of controlling the electronic device may play contents in association with such an event.

15 Claims, 23 Drawing Sheets

FIG. 6

| DLNA DEVICE \ DLNA FUNCTION | DMC | DMS | DMP | DMR |
|---|---|---|---|---|
| FIRST ELECTRONIC DEVICE(10) (Desktop Computer) | ○ | ○ | ○ | ○ |
| SECOND ELECTRONIC DEVICE(11) (DTV) | × | × | × | ○ |
| THIRD ELECTRONIC DEVICE(12) (Notebook Computer) | × | ○ | × | ○ |
| FOURTH ELECTRONIC DEVICE(13) (MID) | ○ | × | ○ | ○ |
| FIRST MOBILE TERMINAL(100) (Mobile Phone) | ○ | ○ | ○ | ○ |
| SECOND MOBILE TERMINAL(101) (Mobile Phone) | ○ | ○ | ○ | ○ |
| THIRD MOBILE TERMINAL(102) (Mobile Phone) | ○ | ○ | ○ | ○ |

ELECTRONIC DEVICE AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2010-0061051, filed Jun. 28, 2010, the contents of which is hereby incorporated by reference herein in its entirety.

BACKGROUND

1. Field

Exemplary embodiments of the present invention are directed to an electronic device and a method of controlling the electronic device may play contents in association with such an event where an electronic device enters into or comes out of a network environment including a plurality of electronic devices that may communicate with each other.

2. Related Art

In recent years, development of hardware and software and convergence of networks allow electronic devices to communicate with each other in various communication manners and render the electronic devices applicable in a diversity of areas.

Accordingly, there is a need of a more user-friendly user interface (UI) for an electronic device that may communicate with another electronic device, and a need for developing various methods of being able to effectively control an electronic device so that a user may simultaneously enjoy various contents in a plurality of electronic devices (for example, 3-screen play or 5-screen play).

SUMMARY

Exemplary embodiments of the present invention provide an electronic device and a method of controlling the electronic device may play contents in association with such an event where a mobile terminal enters into or comes out of a network environment including a plurality of electronic devices that may communicate with each other.

According to an embodiment of the present invention, there is provided an electronic device comprising a communication unit configured to connect to a local network, and a controller configured to automatically output a control signal when a first mobile terminal enters into the local network, the control signal enabling contents preset corresponding to the first mobile terminal or a first user of the first mobile terminal to be played by a second electronic device included in the local network.

According to an embodiment of the present invention, there is provided a method of controlling an electronic device included in a local network, the method comprising automatically outputting a control signal when a first mobile terminal enters into the local network, the control signal enabling contents preset corresponding to the first mobile terminal or a first user of the first mobile terminal to be played by a second electronic device included in the local network.

According to the embodiments of the present invention, the electronic device and the method of controlling the electronic device may automatically play specific contents through a specific electronic included in a network environment including a plurality of electronic devices when a mobile terminal enters into the network environment, and may automatically pause the play of the specific contents when the mobile terminal comes out of the network environment.

BRIEF DESCRIPTION OF THE DRAWINGS

The implementation of this document will be described in detail with reference to the following drawings in which like numerals refer to like elements.

FIG. 6 is a table summarizing DLNA functions of the plurality of electronic devices.

DETAILED DESCRIPTION

Figure 1:
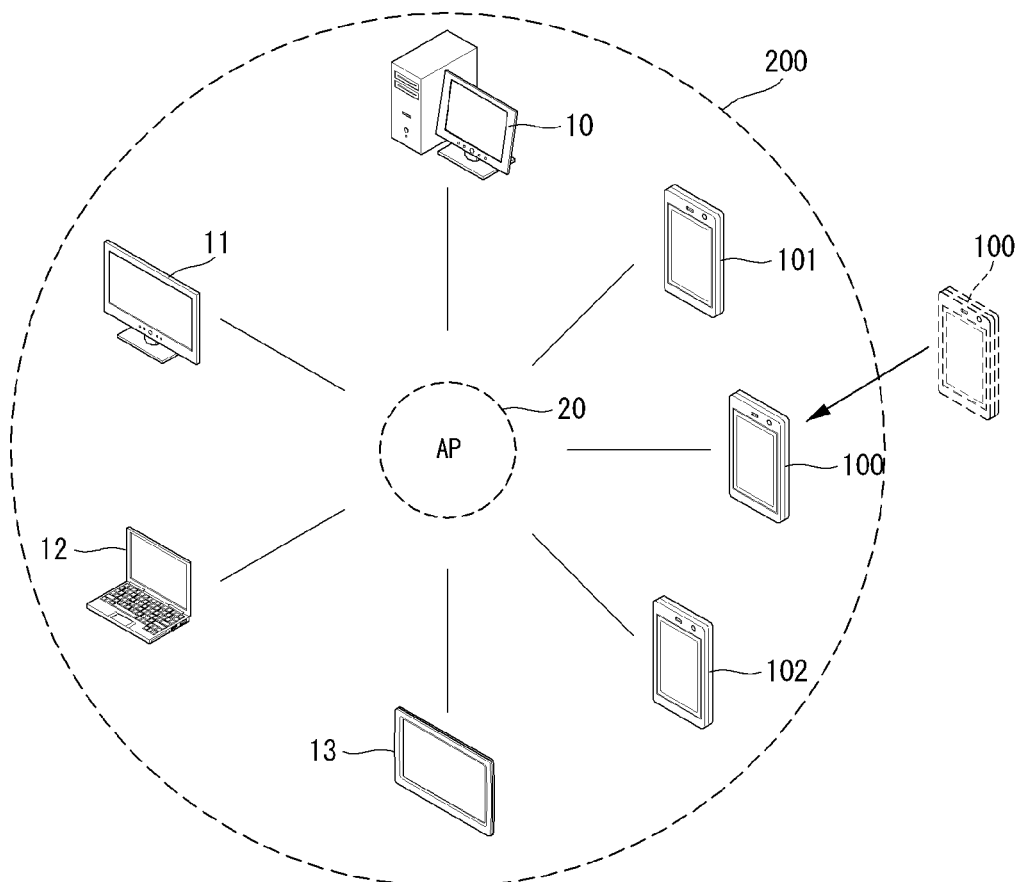
FIGS. 1 and 2 are views schematically illustrating a system environment according to an embodiment of the present invention.
Figure 2:
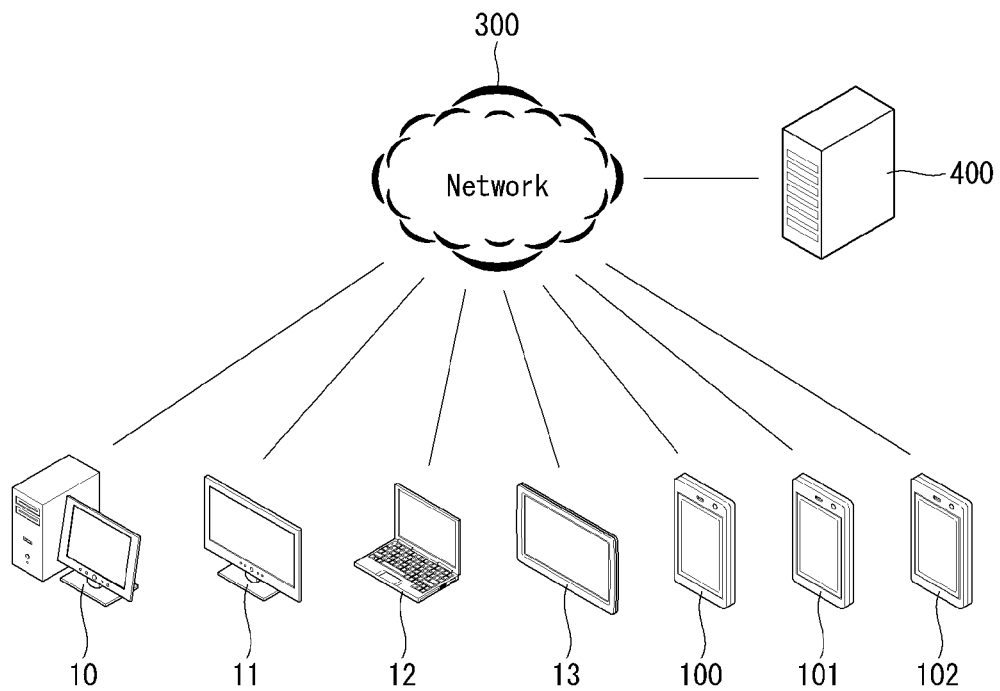

FIGS. 1 and 2 are views schematically illustrating a system environment according to an embodiment of the present invention.

Referring to FIGS. 1 and 2, the system environment may include a plurality of electronic devices 10, 11, 12, 13, 100, 101, and 102, a network 300, and a server 400 over the network 300.

The plurality of electronic devices 10, 11, 12, 13, 100, 101, and 102 may constitute a local network 200, such as an UPnP (Universal Plug and Play) and a DLNA (Digital Living Network Alliance) as shown in FIG. 1.

The plurality of electronic devices 10, 11, 12, 13, 100, 101, and 102 may communicate with each other in a wireless or wired communication method as shown in FIG. 1.

Any communication method may be applicable to communication between the plurality of electronic devices 10, 11, 12, 13, 100, 101, and 102. For example, any communication method that will appear in the future as well as existing communication methods may be applied to communication between the electronic devices 10, 11, 12, 13, 100, 101, and 102.

According to an embodiment, the plurality of electronic devices 10, 11, 12, 13, 100, 101, and 102 may communicate with each other in a communication method such as UPnP, DLNA, or WiFi.

According to an embodiment, the plurality of electronic devices 10, 11, 12, 13, 100, 101, and 102 may constitute a DLNA network 200 and communicate with each other via an AP (Access Point) 20 in a WiFi communication method.

According to an embodiment, the plurality of electronic devices 10, 11, 12, 13, 100, 101, and 102 may communicate with each other over the network 200 or in a near field communication method.

As shown in FIG. 2, the plurality of electronic devices 10, 11, 12, 13, 100, 101, and 102 may communicate with the network 300. For example, the plurality of electronic devices 10, 11, 12, 13, 100, 101, and 102 may receive multimedia contents from the server 400 included in the network 300.

The network 300 may include, for example, a mobile communication network, a wired Internet service network, a wireless Internet service network, and a broadcast network.

The plurality of electronic devices 10, 11, 12, 13, 100, 101, and 102 may include a stationary terminal and a mobile terminal.

The plurality of electronic devices 10, 11, 12, 13, 100, 101, and 102 may include, for example, a mobile phone, a smart phone, a desktop computer, a laptop computer, a digital broadcasting terminal, a PDA (Personal Digital Assistant), a PMP (Portable Multimedia Player), a navigation system, and a MID (Mobile Internet Device).

The plurality of electronic devices 10, 11, 12, 13, 100, 101, and 102 include a first electronic device 10, a second electronic device 11, a third electronic device 12, a fourth electronic device 13, a first mobile terminal 100, a second mobile terminal 101, and a third mobile terminal 102.

As shown in FIGS. 1 and 2, the first electronic device 10, the second electronic device 11, the third electronic device 12, and the fourth electronic device 13 may be a desktop computer, a DTV (Digital TV), a laptop computer, and a MID, respectively. And, the first to third mobile terminals 100, 101, and 102 may be a mobile phone.

Hereinafter, an example of compatibility and content sharing between the plurality of electronic devices 10, 11, 12, 13, 100, 101, and 102 over a DLNA network 200 will be described with reference to FIGS. 3 and 4.

Figure 3:
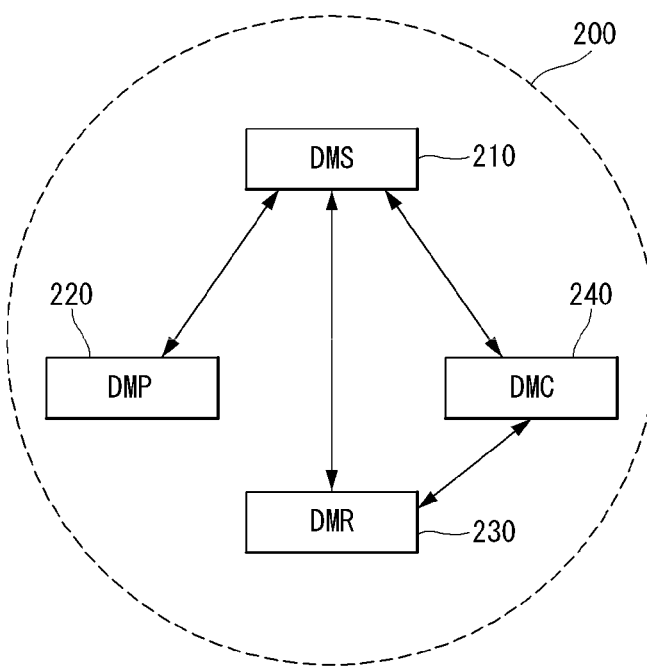
FIG. 3 is a view illustrating a concept of a DLNA network.

FIG. 3 is a view illustrating a concept of a DLNA network.

The DLNA is a standardization organization established to allow contents including music files, moving pictures, and still images to be shared between electronic devices over a network.

The DLNA network 200 is based on an UPnP protocol.

The DLNA network 200 may include a digital media server (DMS) 210, a digital media player (DMP) 220, a digital media renderer (DMR) 230, and a digital media controller (DMC) 240.

The DLNA network 200 may include one or more DMS 210, DMP 220, DMR 230, and DMC 240. The DLNA network 200 may provide a standard allowing the electronic devices to be compatible with each other. The DLNA network 200 may also provide a standard allowing the DMS 210, the DMP 220, the DMR 230, and the DMC 240 to be compatible with each other.

The DMS 210 may provide digital media contents. The DMS 210 may store and manage contents. The DMS 210 may receive various commands from the DMC 240 and perform predetermined operations in response to the received commands. For example, in response to a play command from the DMC 240, the DMS 210 may search contents to play and provide the searched contents to the DMR 230. The DMS 210 may include, for example, a PC (Personal Computer), a PVR (Personal Video Recorder), and a settop box.

The DMP 220 may control contents or electronic devices or may enable contents to be played. For example, the DMP 220 may perform a function of the DMR 230 for playing contents and a function of the DMC 240 for controlling other electronic devices. The DMP 220 may include, for example, a TV, a DTV, and a home theater system.

The DMR 230 may play the contents received from the DMS 210. The DMR 230 may include, for example, a digital picture frame device, a computer, and an MID.

The DMC 240 may control the DMS 210, the DMP 220, and the DMR 230. The DMC 240 may include, for example, a computer, a mobile phone, and a PDA.

The DLNA network 200 may include the DMS 210, the DMR 230, and the DMC 240, or the DMP 220 and the DMR 230.

It should be noted that the constitutional elements "DMS 210", "DMP 220", "DMR 230", and "DMC 240" are named according to their function. Accordingly, for example, a mobile phone that may have both a control function and a play function may correspond to the DMP 220. The DTV 100 that may store and manage contents may be correspondent to the DMS 210 as well as the DMP 220.

For example, each of the plurality of electronic devices 10, 11, 12, 13, 100, 101, and 102 may perform a function corresponding to at least any one of the DMS 210, the DMP 220, the DMR 230, and the DMC 240 while the plurality of electronic devices 10, 11, 12, 13, 100, 101, and 102 constitute the DLNA network 200.

Figure 4:
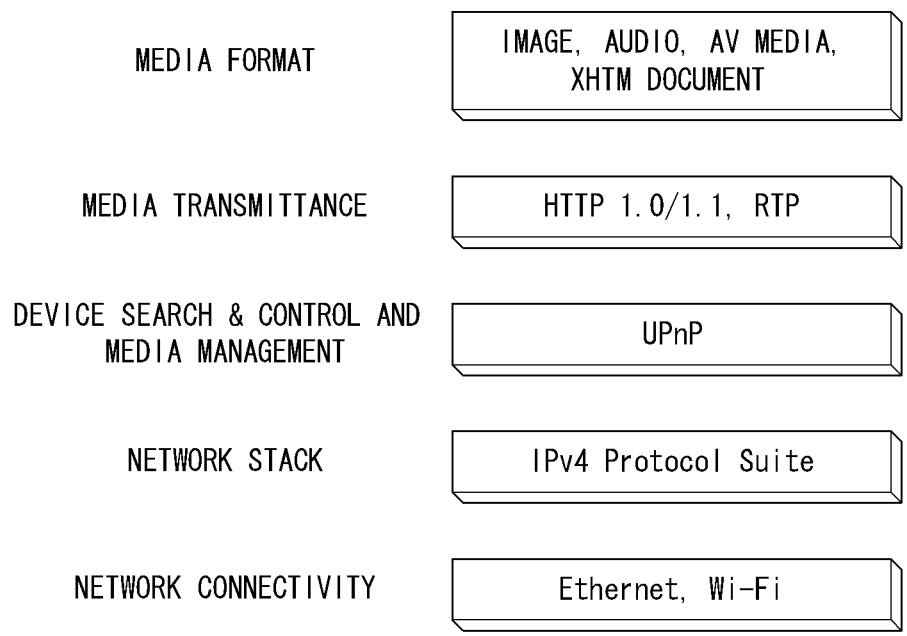
FIG. 4 illustrates functional components based on DLNA.

FIG. 4 illustrates functional components based on DLNA.

The DLNA-based functional components may include a media format layer, a media transport layer, a device discovery & control and media management layer (hereinafter, simply referred to as "DDCM layer"), a network stack layer, and a network connectivity layer.

The network connectivity layer may include a physical layer and a link layer of a network. The network connectivity layer may include Ethernet, WiFi, and Bluetooth.

Besides, a communication medium that may perform IP access is available.

The network stack layer may utilize an IPv4 protocol.

The DDCM layer may be based on UPnP, especially UPnP AV Architecture and UPnP Device Architecture. For example, the DDCM layer may utilize an SSDP (Simple Service Discovery Protocol) for device discovery. Further, the DDCM layer may use a SOAP (Simple Object Access Protocol) for control.

The media transport layer may use HTTP 1.0/1.1 for streaming play. Or, the media transport layer may use a RTP (Real-time Transport Protocol).

The media format layer may use an image, an audio, an AV media, or an XHTML (Extensible Hypertext Markup Language) document.

It will now be described with reference to FIGS. 5 and 6 how the plurality of electronic devices 10, 11, 12, 13, 100, 101, and 102 shown in FIGS. 1 and 2 constitute the DLNA network 200.

Figure 5:
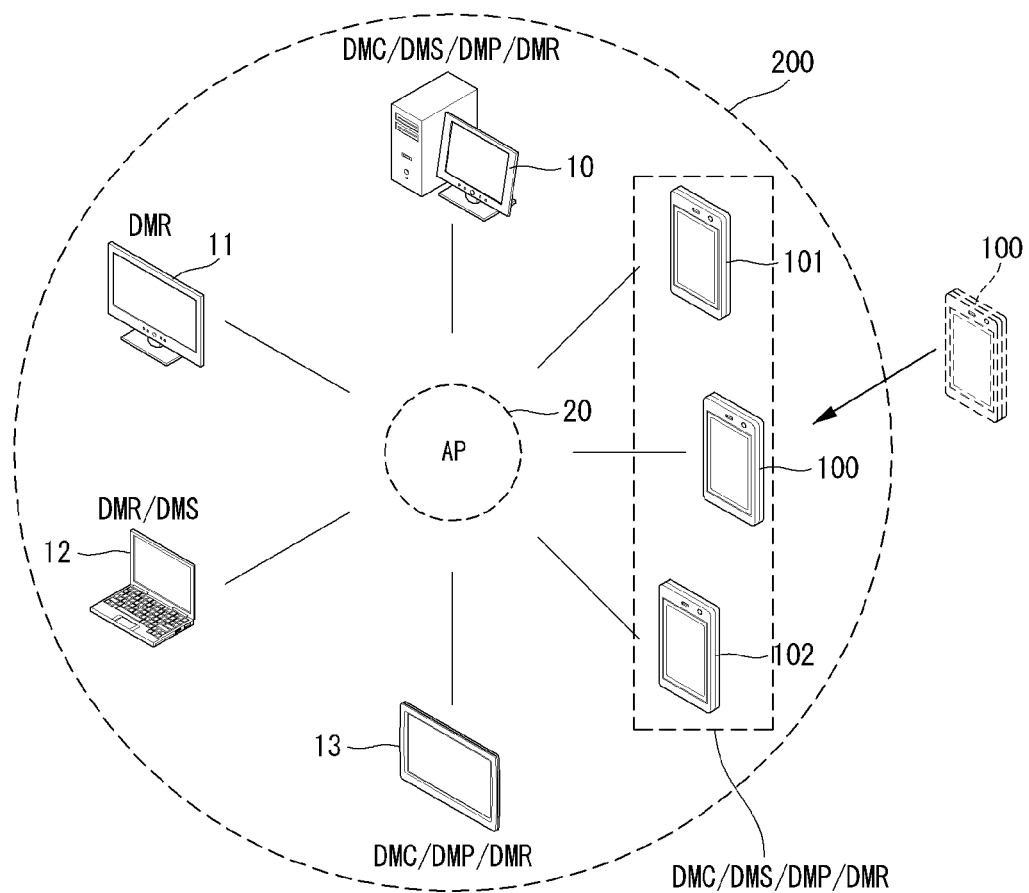
FIG. 5 is a view schematically illustrating the system environment shown in FIG. 1 constitutes the DLNA network.

For convenience of description, it is assumed in the subsequent embodiments that the plurality of electronic devices 10, 11, 12, 13, 100, 101, and 102 constitute a DLNA network 200 shown in FIGS. 5 and 6.

FIG. 5 is a view schematically illustrating the system environment shown in FIG. 1 constitutes the DLNA network 200. FIG. 6 is a table summarizing DLNA functions of the plurality of electronic devices 10, 11, 12, 13, 100, 101, and 102.

For example, the first electronic device 10 may perform all the functions of the DMS 210, the DMP 220, the DMR 230, and the DMC 240.

According to an embodiment, the second electronic device 11 may perform only the function of the DMR 230.

According to an embodiment, the third electronic device 12 may perform the functions of the DMS 210 and the DMR 230.

According to an embodiment, the fourth electronic device 12 may perform the functions of the DMP 220, the DMR 230, and the DMC 240.

According to an embodiment, like the first electronic device 10, each of the first to third mobile terminals 100, 101, and 102 may perform all the functions of the DMS 210, the DMP 220, the DMR 230, and the DMC 240.

Hereinafter, among the plurality of electronic devices 10, 11, 12, 13, 100, 101, and 102, the first mobile terminal 100 will be described in greater detail with reference to the accompanying drawings.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Figure 7:
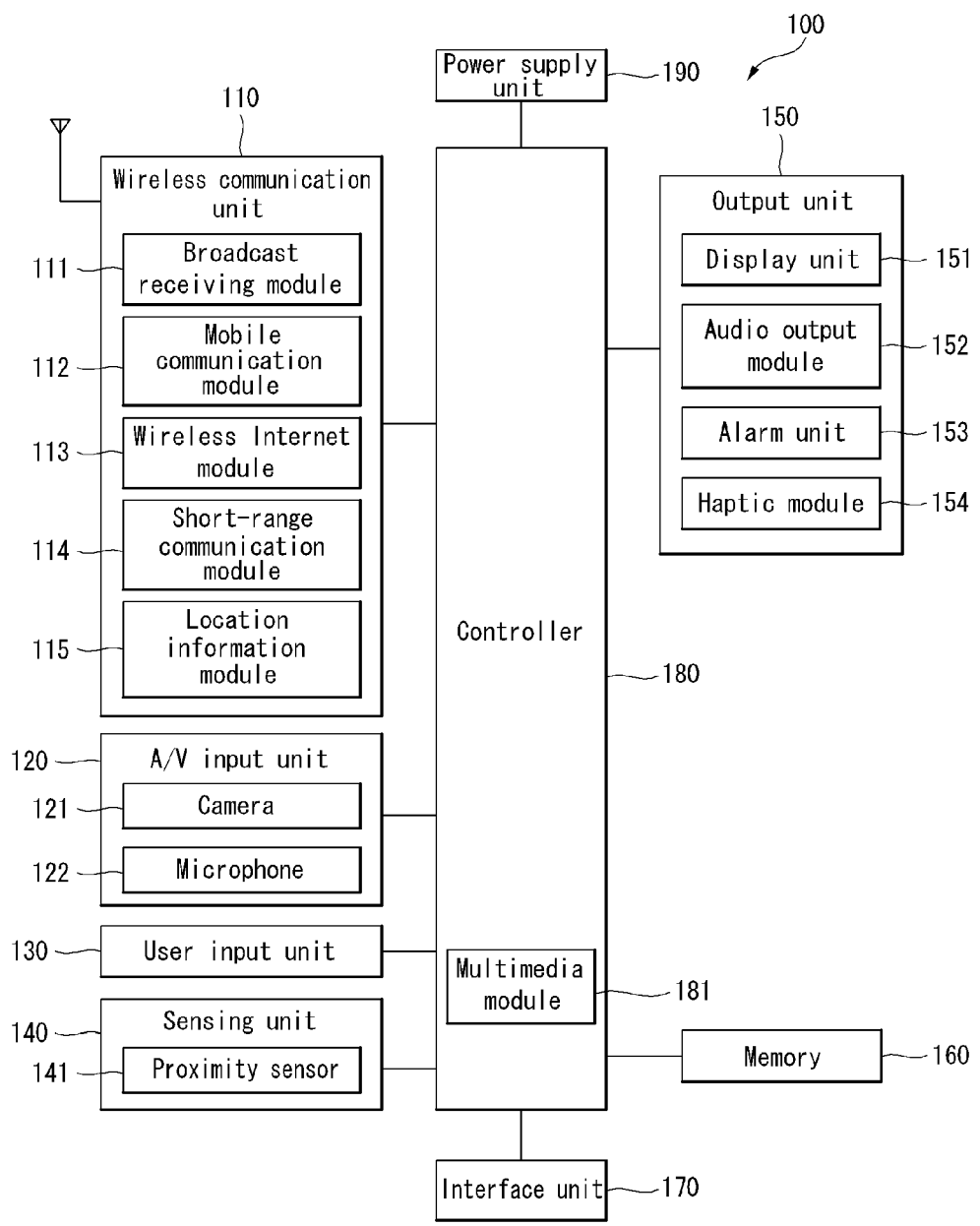
FIG. 7 is a block diagram illustrating a first mobile terminal according to an embodiment of the present invention.

FIG. 7 is a block diagram illustrating the first mobile terminal 100 according to an embodiment of the present invention.

The first mobile terminal 100 includes a wireless communication unit 110, an audio/video (A/V) input unit 120, a user input unit 130, a sensing unit 140, an output unit 150, a memory 160, an interface unit 170, a controller 180, and a power supply 190. The components shown in FIG. 7 are not necessary components, and thus, other components than those shown in FIG. 7 may also be included or some of the components shown in FIG. 7 may be omitted.

Hereinafter, each of the components will be described in greater detail.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the first mobile terminal 100 and a wireless communication system or a network within which the first mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the first mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the first mobile terminal 100. This wireless Internet module 113 may be internally or externally coupled to the first mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the first mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

The audio/video (A/V) input unit 120 may provide audio or video signal input to the first mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The first mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the first mobile terminal 100. For example, the sensing unit 140 may detect an open/close status (or state) of the first mobile terminal 100, a relative positioning of components (e.g., a display and a keypad) of the first mobile terminal 100, a change of position of the first mobile terminal 100 or a component of the first mobile terminal 100, a presence or absence of user contact with the first mobile terminal 100, and/or an orientation or acceleration/deceleration of the first mobile terminal 100.

The first mobile terminal 100 may be configured as a slide-type mobile terminal. In such a configuration, the sensing unit 140 may sense whether a sliding portion of the first mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141, a motion detecting sensor 142, a brightness detecting sensor 143, a distance detecting sensor 144, and/or a heat detecting sensor 145. Details of the proximity sensor 141 and the other sensors 142, 143, 144 and 145 may be explained below.

The motion detecting sensor 142 may detect a motion state of the first mobile terminal 100 by an external force such as an external shock, an external vibration and/or the like. The motion detecting sensor 142 may detect a motion extent. The motion detecting sensor 142 may be provided with a rotational body and detect a motion of the terminal by detecting a property of a mechanical movement of the rotational body. Based on speed, acceleration and direction of the motion, the motion detecting sensor 142 may detect either the motion extent or a motion pattern and then output the detected one to the controller 180. The motion detecting sensor 142 may include a gyro sensor.

The brightness detecting sensor 143 may detect a brightness of light around the first mobile terminal 100 and then output the detected brightness to the controller 180.

The distance detecting sensor 144 may include an ultrasonic sensor or the like. The distance detecting sensor 144 may measure a distance between the first mobile terminal 100 and a user and then output the detected distance to the controller 180.

The heat detecting sensor 145 may be provided around the display 151 of the terminal body. The heat detecting sensor 145 may detect the temperature on user's contact with the terminal body and then output the detected temperature to the controller 180.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the first mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touch screen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 7 shows that the proximity sensor 141 can be provided within the first mobile terminal 100 enclosed by the touch screen or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touch screen is an electrostatic type, the proximity sensor 141 may detect proximity of a pointer using a variation of an electric field according to the proximity of the pointer. In this case, the touch screen (touch sensor) may be classified into the proximity sensor.

An action in which a pointer approaches the touch screen without contacting the touch screen may be called a proximity touch. An action in which a pointer actually touches the touch screen may be called a contact touch. The location of the touch screen proximity-touched by the pointer may be the position of the pointer that vertically opposes the touch screen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touch screen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the first mobile terminal 100. The audio output module 152 may include a receiver, a speaker, a buzzer and/or the like.

The alarm 153 may output a signal for announcing an event occurrence of the first mobile terminal 100. An event occurring in the first mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the first mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The first mobile terminal 100 may operate in association with a web storage that performs a storage function of the memory 160 in the Internet.

The interface unit 170 may play a role as a passage to external devices connected to the first mobile terminal 100. The interface unit 170 may receive data from an external device. The interface unit 170 may be supplied with a power and then the power may be delivered to elements within the first mobile terminal 100. The interface unit 170 may enable data to be transferred to an external device from an inside of the first mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the first mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the first mobile terminal 100 via the port.

The interface unit 170 may play a role as a passage for supplying a power to the first mobile terminal 100 from a cradle that is connected to the first mobile terminal 100. The interface unit 170 may play a role as a passage for delivering various command signals, which are inputted from the cradle by a user, to the first mobile terminal 100. Various command signals inputted from the cradle or the power may work as a signal for recognizing that the first mobile terminal 100 is correctly loaded in the cradle.

The controller 180 may control overall operations of the first mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touch screen as a character an/or recognizing a picture drawing input performed on the touch screen as an image.

The power supply 190 may receive an external or internal power and then supply the power required for operations of the respective elements under control of the controller 180.

Embodiments of the present invention explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 8A:
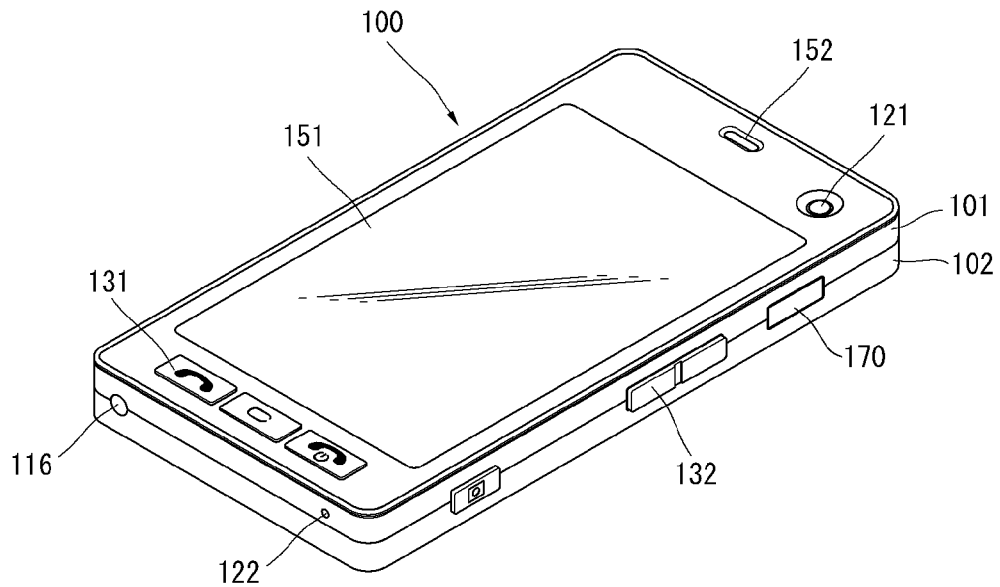
FIG. 8A is a front perspective view illustrating the first mobile terminal or an exemplary mobile terminal according to an embodiment of the present invention.

FIG. 8A is a front perspective view of the first mobile terminal or a mobile terminal according to an exemplary embodiment.

As shown in FIG. 8A, the first mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the first mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 8B:
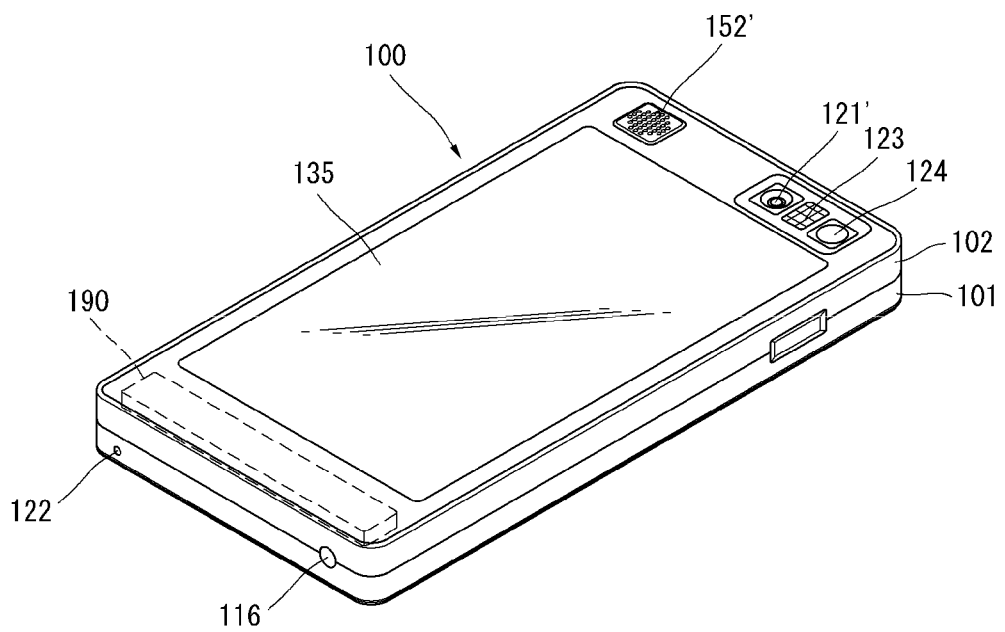
FIG. 8B is a rear perspective view illustrating the mobile terminal shown in FIG. 8A.

FIG. 8B is a rear perspective diagram of the mobile terminal shown in FIG. 8A. Other embodiments, configurations and arrangements may also be provided.

As shown in FIG. 8B, a camera 121' may be additionally provided on a backside of the terminal body, and more particularly on the rear case 102. The camera 121' may have a photographing direction that is substantially opposite to a photographing direction of the camera 121 (shown in FIG. 8A) and may have pixels differing from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 8A and may be used for implementation of a speakerphone mode in talking over the terminal.

A broadcast signal receiving antenna 124 may be additionally provided at the lateral side of the terminal body as well as an antenna for communication or the like. The antenna 124 may be considered a portion of the broadcast receiving module 111 shown in FIG. 7 and may be retractably provided on the terminal body.

The power supply 190 for supplying a power to the first mobile terminal 100 may be provided to the terminal body. The power supply 190 may be built within the terminal body. Alternatively, the power supply 190 may be detachably connected to the terminal body.

FIG. 8B also shows a touchpad 135 for detecting a touch that is additionally provided on the rear case 102. The touchpad 135 may be configured in a light transmittive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touch screen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

Interconnected operational mechanism between the display 151 and the touchpad 135 may now be explained with reference to FIGS. 9A and 9B.

Figure 9A:
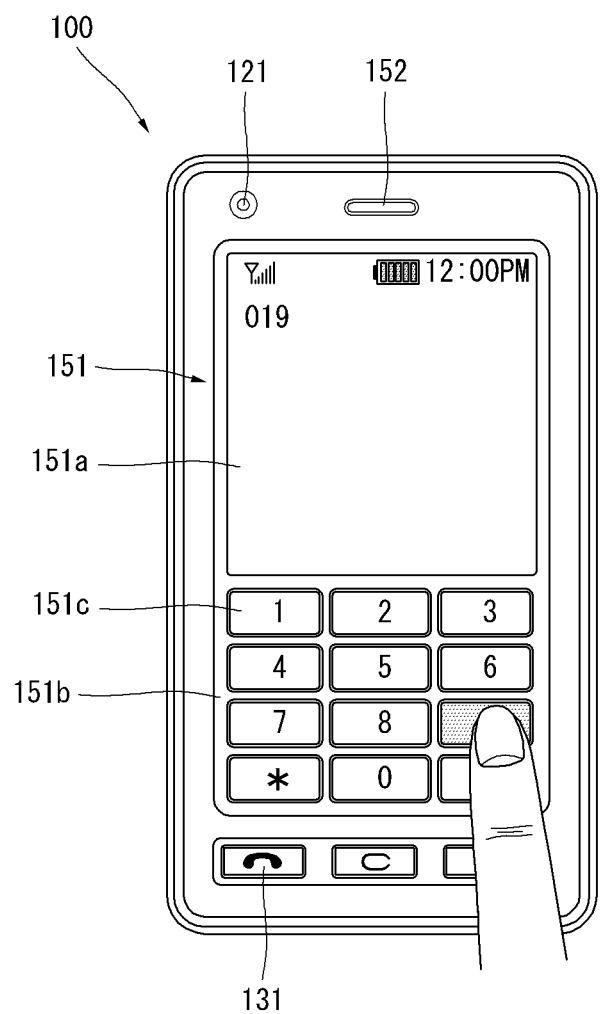
FIGS. 9A and 9B are front views illustrating a mobile terminal according to an embodiment of the present invention.
Figure 9B:
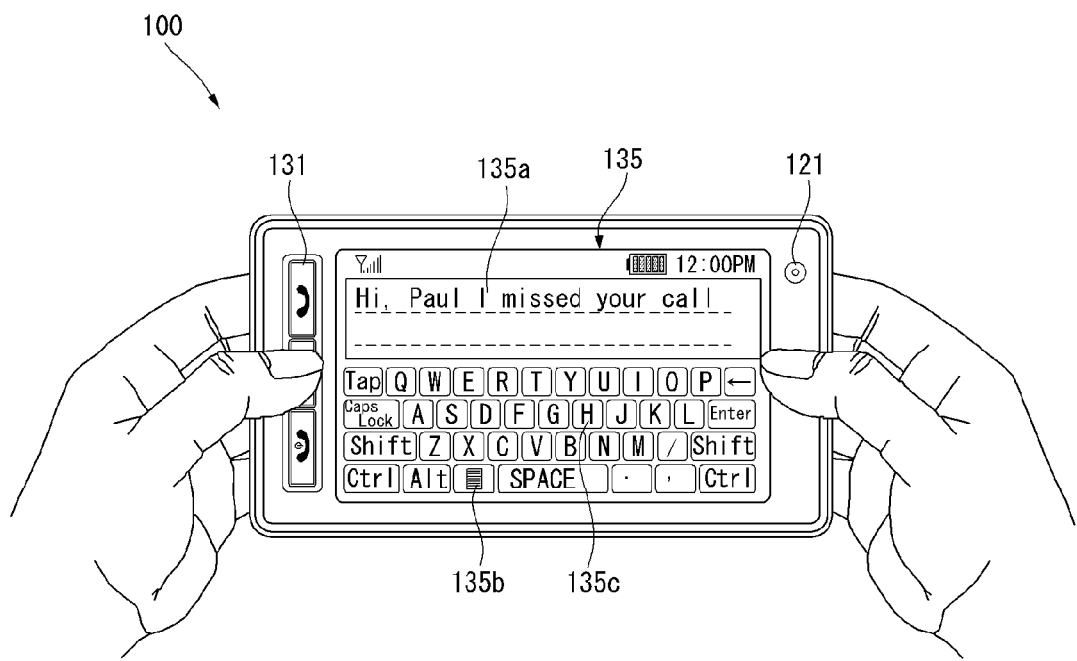

FIGS. 9A and 9B are front-view diagrams of a mobile terminal according to an example embodiment. Other embodiments, configurations and arrangements are also within the scope of the present invention.

Various kinds of visual information may be displayed on the display 151. The displayed information may be characters, numerals, symbols, graphics, icons and/or the like.

In order to input the information, at least one of the characters, numerals, symbols, graphics and icons may be represented as a single predetermined array to be implemented in a keypad formation. The keypad formation may be called soft keys.

FIG. 9A shows that an input touch may be applied to a soft key through a front face of a terminal body.

The display 151 may be operable through an entire area or may be divided into a plurality of regions. The plurality of the regions may be configured interoperable.

An output window 151a may be displayed on a top portion of the display 151 and an input window 151b may be displayed on a bottom portion of the display 151. A soft key 151c representing a digit for inputting a phone number or the like may be output to the input window 151b. If the soft key 151c is touched, a digit corresponding to the touched soft key may be outputted to the output window 151a. If the first manipulating unit 131 is manipulated, a call connection for a phone number displayed on the output window 151a may be attempted.

FIG. 9B shows that an input touch may be applied to a soft key through a rear face of a terminal body. FIG. 9A shows that the terminal body is vertically arranged (i.e., in a portrait manner). FIG. 9B shows that the terminal body is horizontally arranged (i.e., in a landscape manner). The display 151 may change an output picture according to the arranged direction of the terminal body.

FIG. 9B also shows that a text input mode is activated in the first mobile terminal 100. FIG. 9B shows that the touchscreen 135 may include an output window 135a and an input window 135b. The output window 135a and the input window 135b may be displayed on the display 151. A plurality of soft keys 135c representing characters, symbols and/or digits may be arranged in the input window 135b. The soft keys 135c may be arranged in a QWERTY key formation.

If the soft keys 135c are touched using the touchpad 135, the characters, symbols and/or digits corresponding to the touched soft keys may be outputted to the output window 135a. Touch input via the touchpad 135 may be advantageous in that the soft keys 135c may be prevented from being blocked by a finger in case of touch, which is compared to the touch input via the display 151. If the display 151 and the touchpad 135 are transparent, the first mobile terminal 100 may visually check or determine whether fingers are located at the backside of the terminal body. Hence, more correct touch inputs may be made.

The display 151 and/or the touchpad 135 may receive a touch input by scrolling. A user may scroll the display 151 or the touchpad 135 to shift a cursor or pointer located at an entity (e.g., icon or the like) displayed on the display 151. If a finger is shifted on the display 151 or the touchpad 135, a path of the shifted finger may be visually displayed on the display 151. This may be useful in editing an image displayed on the display 151.

If both the display (touchscreen) 151 and the touchpad 135 are touched together within a predetermined amount of time, a particular function of the first mobile terminal 100 can be executed. The simultaneous touch may correspond to a case that the terminal body is held by a user using a thumb and a first finger (clamping). The function may include activation or deactivation for the display 151 or the touchpad 135.

The proximity sensor 141 described with reference to FIG. 7 may now be explained in detail with reference to FIG. 10.

Figure 10:
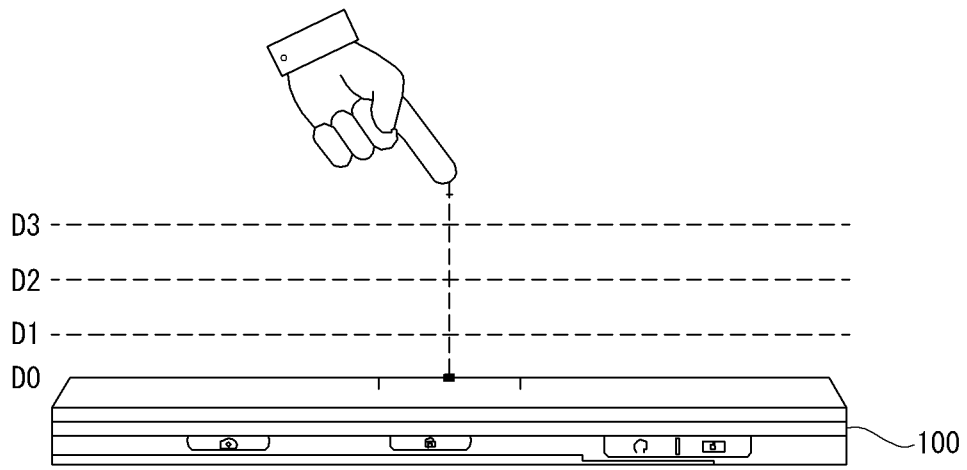
FIG. 10 is a view illustrating a proximity depth of a proximity sensor.

FIG. 10 is a diagram relating to a proximity depth of a proximity sensor. Other embodiments, arrangements and configurations may also be used.

As shown in FIG. 10, when a pointer, such as a user's finger, a pen, a stylus and the like, approaches the touchscreen, the proximity sensor 141 provided within or in a vicinity of the touchscreen may detect the approach of the pointer and then output a proximity signal.

The proximity sensor 141 may output a different proximity signal according to a distance between the pointer and the proximity-touched touchscreen (hereafter referred to as a proximity depth).

FIG. 10 shows a cross-section of the touchscreen provided with a proximity sensor capable of detecting three proximity depths, for example. A proximity sensor that identifies less than 3 proximity depths or more than 4 proximity depths may also be provided.

If the pointer fully contacts the touchscreen (d0), a contact touch may be recognized. If pointer is spaced apart from the touchscreen by a distance less than d1, a proximity touch to a first proximity depth may be recognized. If the pointer is spaced apart from the touchscreen by a distance between d1 and d2, a proximity touch to a second proximity depth may be recognized. If the pointer is spaced apart from the touchscreen in a distance less than d3 or equal to or greater than d2, a proximity touch to a third proximity depth may be recognized. If the pointer is spaced apart from the touchscreen in a distance equal to or greater than d3, a proximity touch is released.

The controller 180 may recognize the proximity touch as one of various input signals according to proximity depth and position of the pointer. The controller 180 may perform various operation controls according to various input signals.

The first mobile terminal 100 described with reference to FIGS. 7 to 10 is merely an example of the plurality of electronic devices 10, 11, 12, 13, 100, 101, and 102 according to an embodiment of the present invention.

Each of the plurality of electronic devices 10, 11, 12, 13, 100, 101, and 102 may include more or less components than those of the first mobile terminal 100 according to an embodiment.

Hereinafter, embodiments of the present invention will be described.

Contents used herein may include, but not limited to, text, still images, moving pictures, animation, broadcast contents, applications, etc.

Figure 11:
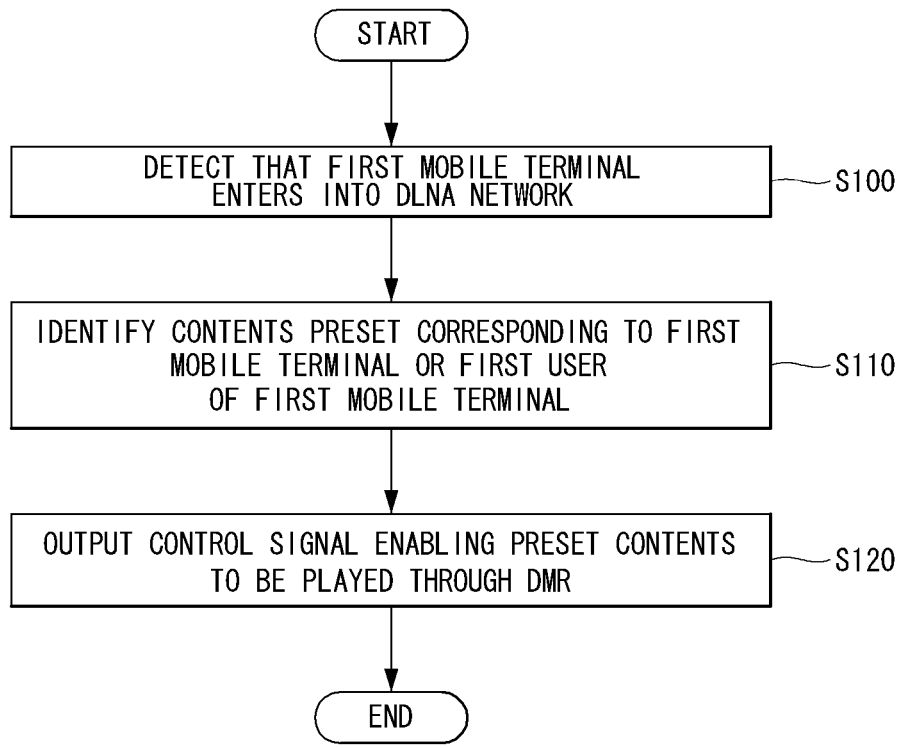
FIG. 11 is a flowchart illustrating a method of controlling an electronic device according to an embodiment of the present invention.

FIG. 11 is a flowchart illustrating a method of controlling an electronic device according to an embodiment of the present invention.

Figure 12:
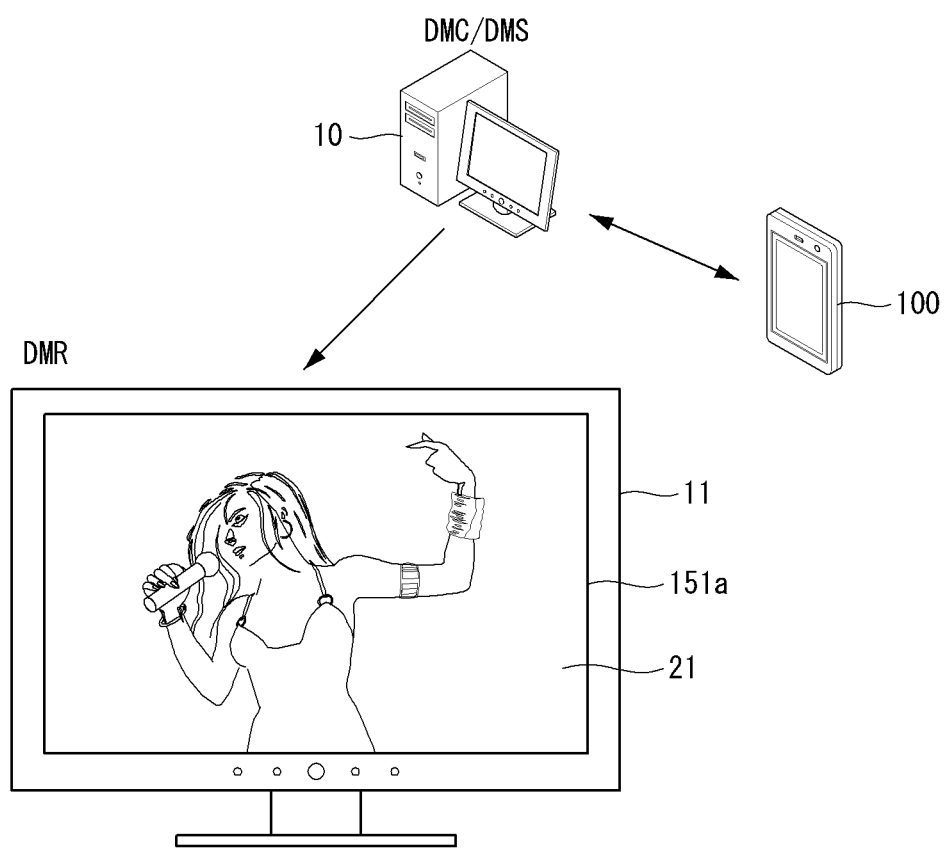
FIGS. 12 and 13 are views illustrating a method of controlling an electronic device according to an embodiment of the present invention.
Figure 13:
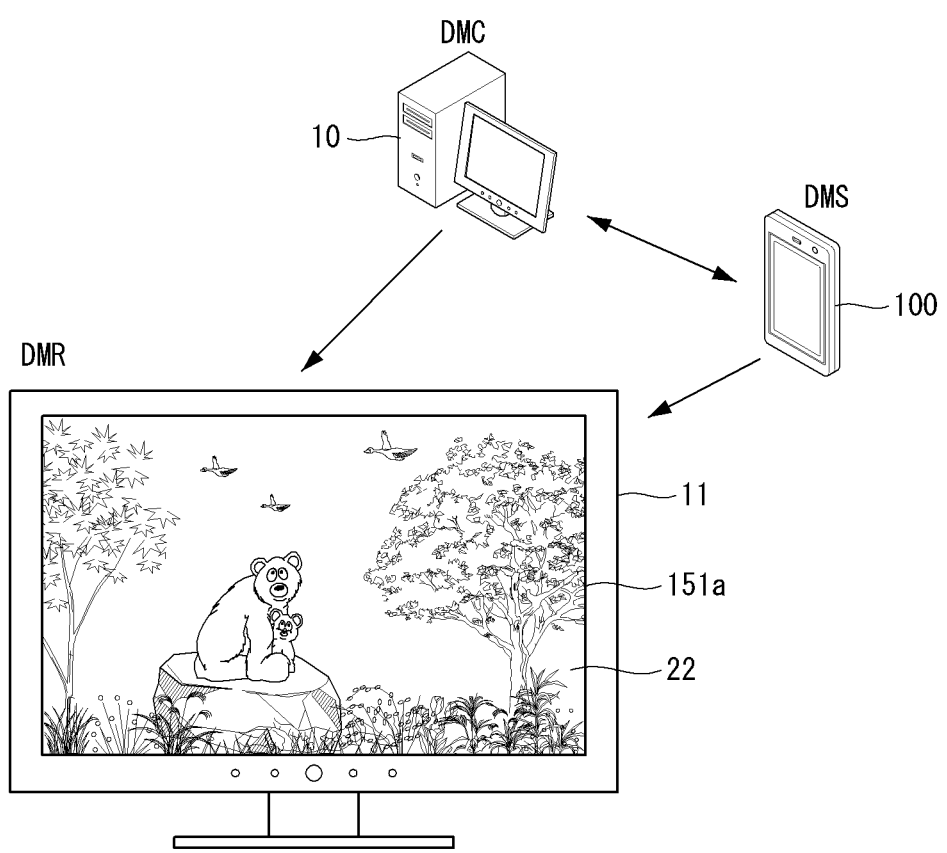

FIGS. 12 and 13 are views illustrating a method of controlling an electronic device according to an embodiment of the present invention.

The method of controlling an electronic device may be implemented by at least one of the plurality of electronic devices 10, 11, 12, 13, 100, 101, and 102 that is set to perform the function of the DMC 240.

For convenience of description, a method of controlling the first electronic device 10 and an operation of the first electronic device 10 will be described.

Referring to FIG. 111, the first electronic device 10 may detect that the first mobile terminal 100 enters into the DLNA network 200 (S100).

FIGS. 1 and 5 conceptually illustrate that the first mobile terminal 100 enters into the DLNA network 200 from an outside of the DLNA network 200.

Each of the electronic devices included in the DLNA network 200 may periodically transmit a discovery message (discovery step). Based on the discovery message, a new device may be searched.

In the discovery step, each of the electronic devices included in the DLNA network 200 may transmit description information including device identification information.

In a case where the first mobile terminal 100 enters into the DLNA network 200 for the first time, a step of registering the first mobile terminal 100 and/or a user using the first mobile terminal 100 (hereinafter, "first user") in the DLNA network 200 may be included. For example, the first mobile terminal 100 and/or the first user may be registered in the first electronic device 10 performing the function of the DMC 240.

The first electronic device 10 may identify contents preset corresponding to the first electronic device 10 or the first user (S110).

The first electronic device 10 may store in a memory information on the contents preset corresponding to the first electronic device 10 or the first user. Further, the memory of the first electronic device 10 may store the preset contents itself.

The information on the preset contents may include identification information on the present contents and a location where the preset contents are stored.

For example, the preset contents may be stored in the DMS 210 included in the DLNA network 200. The DMS 210 may be the DMS 210 previously included in the DLNA network 200 (for example, the first electronic device 10 and the third electronic device 12 as shown in FIG. 6) or the first mobile terminal 100 that has entered into the DLNA network 200.

In a case where the first mobile terminal 100 entered into the DLNA network 200 before, the preset contents may be contents previously indicated by the first user.

Although not being previously indicated by the first user, the preset contents may be automatically selected to comply with the first user's characteristics. This will be described below with reference to FIG. 14.

The first mobile terminal 100 may output a control signal so that the preset contents may be played by an electronic device set to perform the function of the DMR 230 in the DLNA network 200 (S120).

The first mobile terminal 100 may output the control signal to an electronic device set to perform the function of the DMS 210 and an electronic device set to perform the function of the DMR 230.

The control signal outputted to the DMS 210 and the control signal outputted to the DMR 230 may be identical to each other or different from each other to comply with a command made to each of the devices.

For example, when the second electronic device 11 is set as the DMR 230, the second electronic device 11 may receive the control signal from the first mobile terminal 100 and automatically play the preset contents in response to the control signal.

The preset contents may be received from the DMS 210.

For example, referring to FIG. 12, the functions of the DMC 240 and the DMS 210 may be performed by the first mobile terminal 100 and the function of the DMR 230 may be performed by the second electronic device 11.

The second electronic device 11 may receive the preset contents 21 corresponding to the first mobile terminal 100 or the first user from the first electronic device 10 and may output the contents 21 through the output window 151a.

For example, referring to FIG. 13, the first mobile terminal 100 may perform the function of the DMC 240 and the second electronic device 11 may perform the function of the DMR 230 as shown in FIG. 12. The function of the DMS 210 may be performed by the first mobile terminal 100 having entered into the DLNA network 200.

The second electronic device 11 may receive the preset contents 22 corresponding to the first mobile terminal 100 or the first user from the first mobile terminal 100 and may output the contents 22 through the output window 151a.

Like the DMS 210, the DMR 230 may be implemented by various devices.

For example, when a plurality of devices may perform the function of the DMR 230 in the DLNA network 200, the DMR 230 that is to automatically play the contents set for the first mobile terminal 100 or the first user may be determined in association with the first mobile terminal 100 and/or the first user. This will be described below.

The DMR 230 may perform the function of playing the preset contents. The DMR 230 may secure the preset contents in various manners.

For example, the DMR 230 may receive the preset contents from an electronic device performing the function of the DMS 210 as described above.

Also, the DMR 230 may source information on the preset contents from an electronic device performing the function of the DMS 210 or an electronic device performing the function of the DMC 240 and may obtain the preset contents based on the source information. Such a situation may include, for example, when the preset contents are present in the server 400 included in the network 300.

According to an embodiment, the DMR 230 may have a function of receiving a broadcast. The DMR 230 having the broadcast receiving function may receive broadcast channel information associated with the preset contents from an electronic device performing the function of the DMS 210 or an electronic device performing the function of the DMC 240 and may access a broadcast channel corresponding to the broadcast channel information to receive the preset contents. This will be described below in greater detail.

While performing step S120, the first electronic device 10 may identify whether the DMR 230 is on/off. When the DMR 230 is off, the first electronic device 10 may include a command for turning on the DMR 230 in the control signal outputted during step S120. The first electronic device 10 may also output a control signal for turning on the DMR 230 separately from the control signal outputted during step S120.

Figure 14:
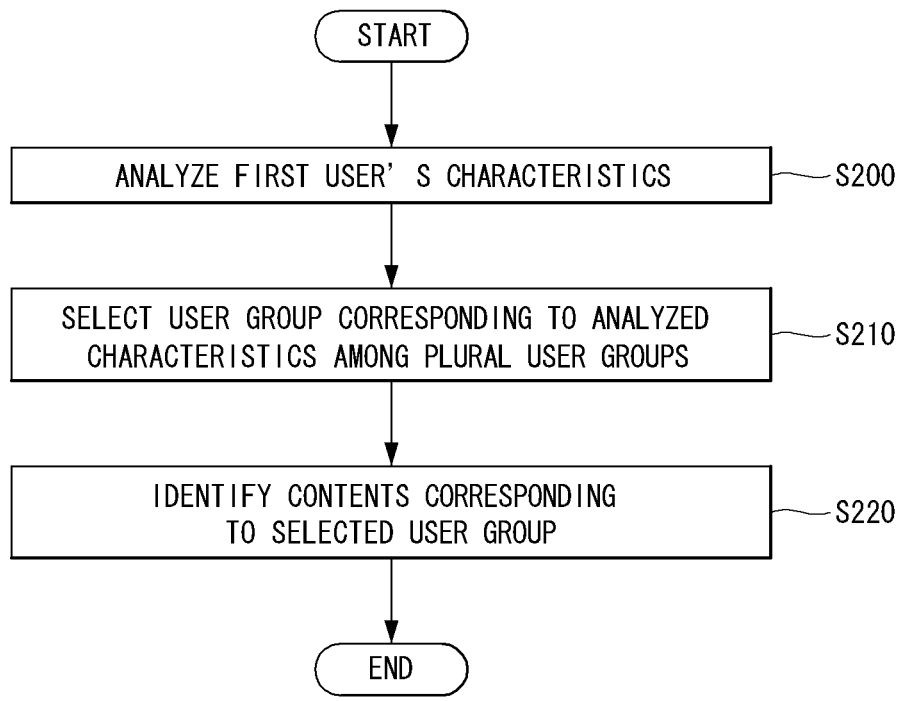
FIG. 14 is a flowchart illustrating a method of selecting the preset contents, wherein an example of step S110 of FIG. 11 is illustrated.

FIG. 14 is a flowchart illustrating a method of selecting the preset contents. FIG. 14 illustrates an example of step S110 of FIG. 11.

Referring to FIG. 14, the first electronic device 10 may analyze characteristics of the first user (S200).

For example, the first electronic device 10 may analyze the first user's sex and age, whether he/she is a minor or not, family relationship (for example, whether he/she is a member in a family or whether he/she is a friend of a family member). According to an embodiment, the first user may be registered in the DLNA network 200 in advance.

The first electronic device 10 may select a user group corresponding to the analyzed characteristics among a plurality of user groups.

The plurality of user groups may be pre-classified depending on at least one criterion and stored. The plurality of user groups and information thereon may be stored in various locations. For example, the plurality of user groups and the information may be stored in the memory of the first electronic device 10 or in the memory 160 of the first mobile terminal 100.

At least one content or at least one type of content may correspond to each of the plurality of user groups.

For example, a user group in which users are in their twenties may correspond to a "sports" genre or contents associated with the sport genre.

According to an embodiment, a user group corresponding to "family" may be correspondent to "family pictures" and/or "notes for family".

The contents or types of contents corresponding to each of the plurality of user groups may be selected based on a plurality of criteria.

For example, even when a user group corresponding to "men" is correspondent to "movie", if the first user is a minor, a movie not admitted for minors may not be selected by the first user.

The first electronic device 10 may identify the contents corresponding to the user group selected in step S210 (S220).

The first electronic device 10 may output a control signal enabling the contents identified in step S220 to be played by the DMR 230 (S120).

Figure 15:
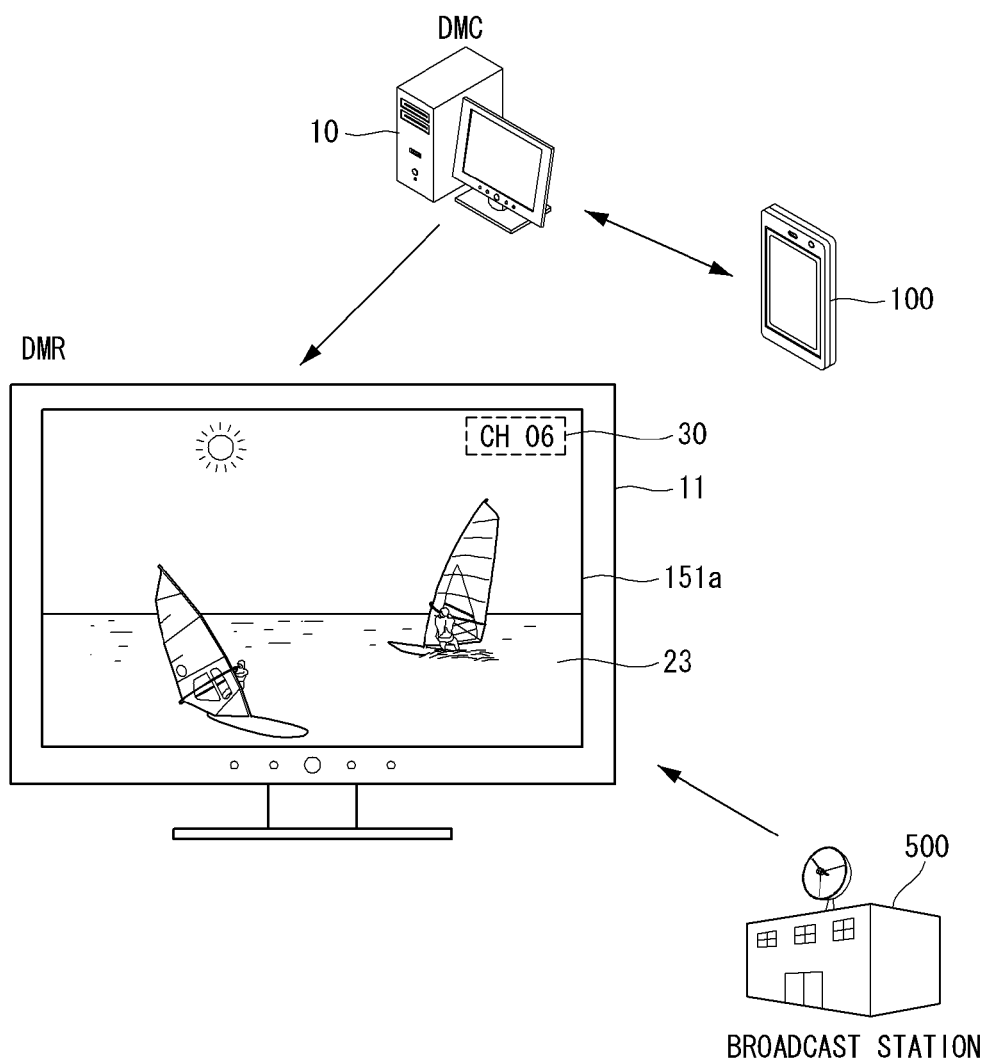
FIG. 15 is a view illustrating an example of implementing the method illustrated in FIG. 11 when the DMR 230 has a function of receiving a broadcast.

FIG. 15 illustrates an example of implementing the method illustrated in FIG. 11 when the DMR 230 has a function of receiving a broadcast.

As described above, the DMR 230 may have a broadcast receiving function in step S220 of FIG. 11.

When the DMR 230 has a broadcast receiving function, the first electronic device 10 may transmit information on a first user's preference channel to the DMR 230. The DMR 230 may receive the information on the first user's preference channel and may access the preference channel to receive and output a broadcast program.

The information on the first user's preference channel may be pre-stored in the DMS 210. According to an embodiment, the first electronic device 10 may output a control signal enabling the information on the first user's preference channel to be transmitted to the DMR 230 to the DMS 210.

Figure 16:
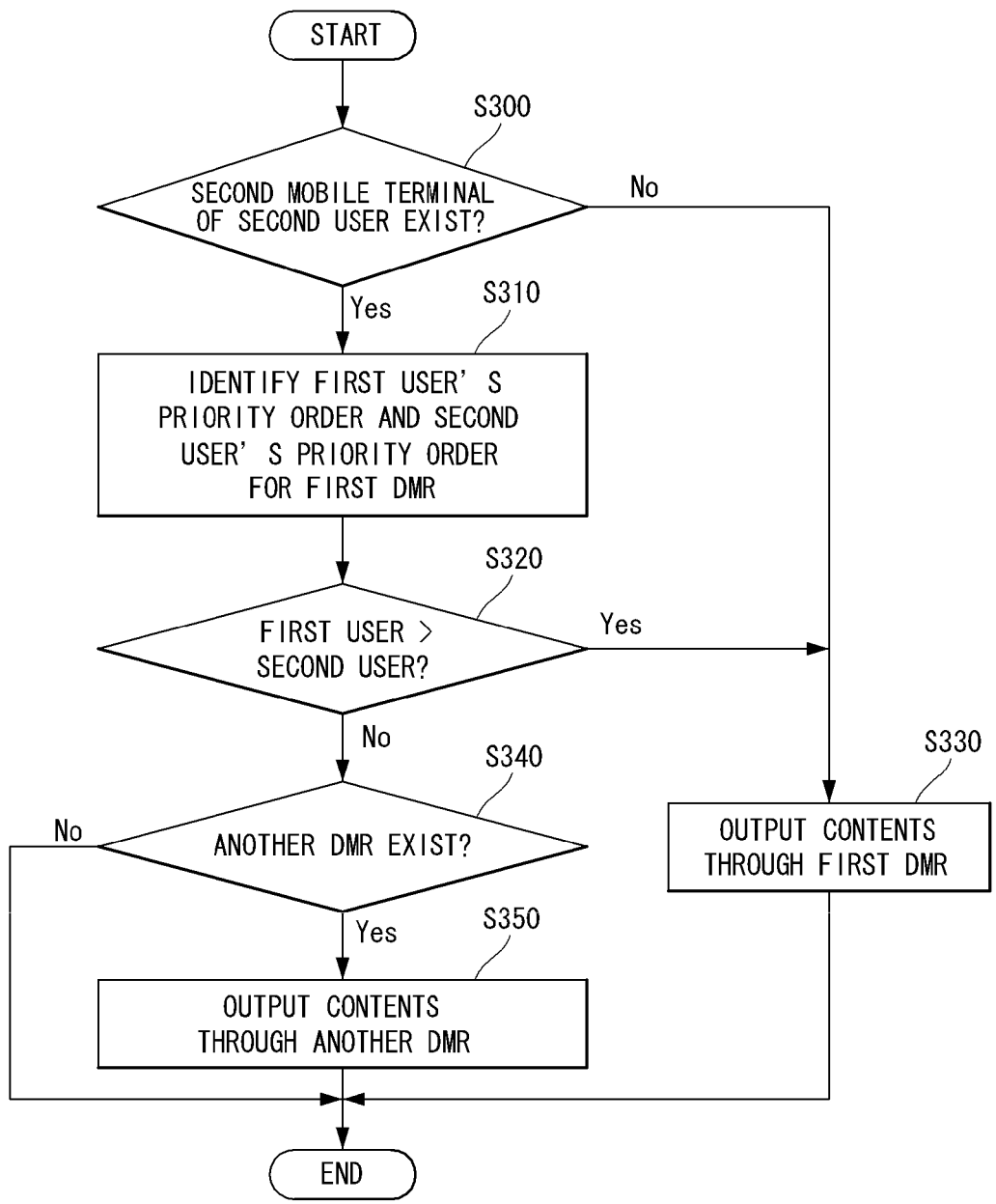
FIG. 16 is a flowchart illustrating a method of controlling an electronic device according to an embodiment of the present invention.

FIG. 16 is a flowchart illustrating a method of controlling an electronic device according to an embodiment of the present invention.

Figure 17:
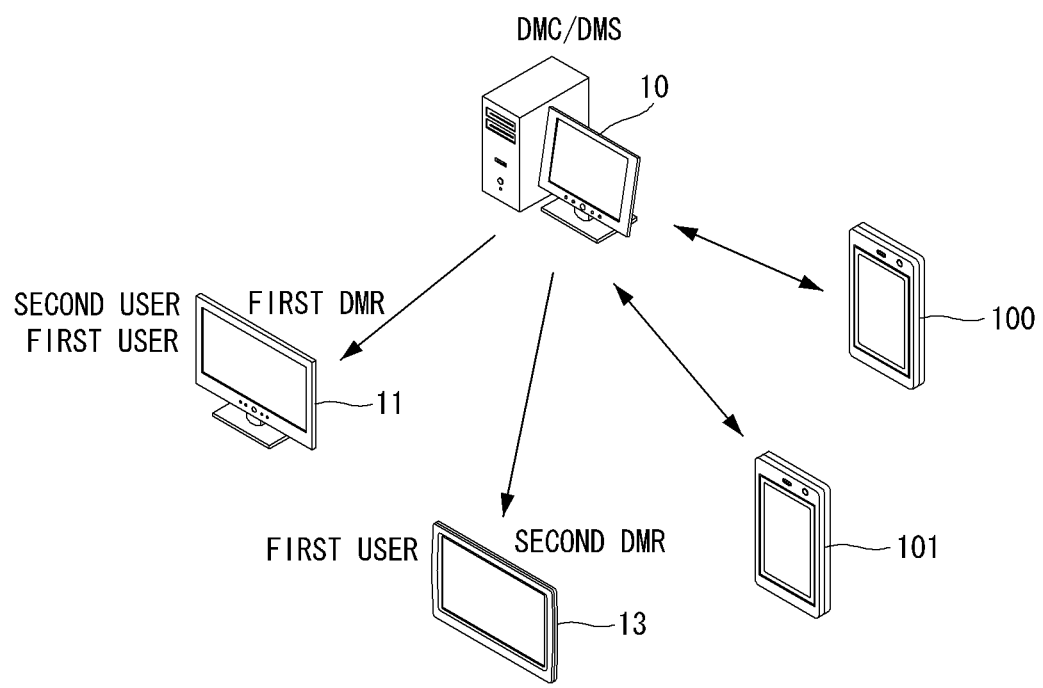
FIG. 17 is a view illustrating a method of controlling an electronic device according to an embodiment of the present invention.

FIG. 17 is a view illustrating a method of controlling an electronic device according to an embodiment of the present invention.

This embodiment may include steps S100 and S110 of FIG. 11. Accordingly, this embodiment may be an example of implementing step S120 of FIG. 11.

The method of controlling an electronic device according to this embodiment may be implemented by an electronic device set to perform the function of the DMC 240 among the plurality of electronic devices 10, 11, 12, 13, 100, 101, and 102.

For convenience of description, a method of controlling the first electronic device 10 and an operation of the first electronic device 10 will be described.

Referring to FIG. 16, upon identifying the preset contents corresponding to the first mobile terminal 100 (S110), the first electronic device 10 may determine whether there is another user's mobile terminal (for example, the second mobile terminal 101 or the third mobile terminal 102) in the DLNA network 200 (S300). For convenience of description, it is assumed that the mobile terminal of another user is the second mobile terminal 101.

The first electronic device 10 may recognize whether the second mobile terminal 101 other than the first mobile terminal 100 is included in the DLNA network 200 based on the discovery message transmitted and received between the electronic devices. The plurality of different DMRs 230 may be set in the DLNA network 200.

For example, referring to FIGS. 5 and 6, the second electronic device 11, the third electronic device 12, and the fourth electronic device 12 may be set as the DMR 230 in the DLNA network 200.

When the plurality of different DMRs 230 are set, the plurality of different DMRs 230 may be prioritized irrespective of their corresponding users or mobile terminals.

At least one of the plurality of different DMRs 230 may be preset corresponding to a specific user or a mobile terminal correspondent to the specific user.

When the first mobile terminal 100 and the second mobile terminal 101 are both present in the DLNA network 200, the first electronic device 10 may identify a first user's priority order for a first DMR and a second user's second priority order for the second mobile terminal 101, the first DMR and the second mobile terminal 101 having a high priority among the plurality of different DMRs 230 (S310).

Based on the identification result in step S310, the first electronic device 10 may determine whether the first user's priority order for the first DMR is set higher than the second user's priority order for the first DMR (S320), and if so, may enable the contents identified in step S110 to be played by the first DMR.

The second user who entered into the DLNA network 200 earlier than the first user and has received contents through the first DMR may receive the contents through a DMR other than the first DMR again or subsequently in a case where an occupancy right for the first DMR is transferred to the first user. The first electronic device 10 may output various control signals associated therewith to necessary devices.

When it is determined in step S320 that the first user's priority order is lower than the second user's priority order, the first electronic device 10 may determine whether a DMR other than the first DMR is present in the DLNA network 200 (S340), and if so, may enable the contents identified in step S110 to be played by the DMR other than the first DMR (S350).

When it is determined in step S340 that no other DMRs are existent, the contents may not be played. According to an embodiment, notification information may be provided to the user.

For example, referring to FIG. 17, it is assumed that two DMRs (first DMR 11 and second DMR 13) are included in the DLNA network 200.

Both the first and second users are set for the first DMR 11. Also, the first user's priority order is set to be higher than the second user's priority order. The first user is only set for the second DMR 13.

FIG. 17 illustrates a situation where the second user (user of the second mobile terminal 101) entered into the DLNA network 200 earlier than the first user (user of the first mobile terminal 100) and then the first user entered into the DLNA network 200.

The first electronic device 10 performing the function of the DMC 240 may detect the entrance of the first mobile terminal 100, identify preset contents corresponding to the first mobile terminal 100 and/or the first user, and transmit a control signal enabling the identified contents to be outputted by the first DMR 11. It is assumed that the first DMR 11 has a higher priority order than that of the second DMR 13 for the first user.

Since the second user already occupies the first DMR 11, the first electronic device 10 may output a control signal enabling the contents to be outputted by another DMR corresponding to the first user, i.e., the second DMR 13.

When for the first user, the second DMR 13 is set to have a higher priority order than that of the first DMR 11, the first electronic device 10 may output a control signal enabling the contents to be outputted by the second DMR 13 because no user occupies the second DMR 13.

Referring to FIGS. 16 and 17, in a case where a mobile terminal of a user other than the first user is included in the DLNA network 200 and the preset DMR is set for the user other than the first user or his mobile terminal, when the priority order of the first user is set to be higher than that of the second user, the first electronic device 10 may output a control signal enabling the contents preset for the first user to be outputted by the preset DMR.

In a case where a plurality of DMRs are included in the DLNA network 200, the first mobile terminal 100 may output a control signal enabling the preset contents to be outputted by the DMR preset for the first mobile terminal 100 or the first user among the plurality of DMRs.

Further, in a case where the second mobile terminal of the second user different from the first user is included in the DLNA network 200 and the preset DMR is set for the second user or the second mobile terminal, when the priority order of the first user is set to be lower than that of the second user, the first electronic device 10 may output a control signal enabling the preset contents to be outputted by a DMR other than the preset DMR.

Figure 18:
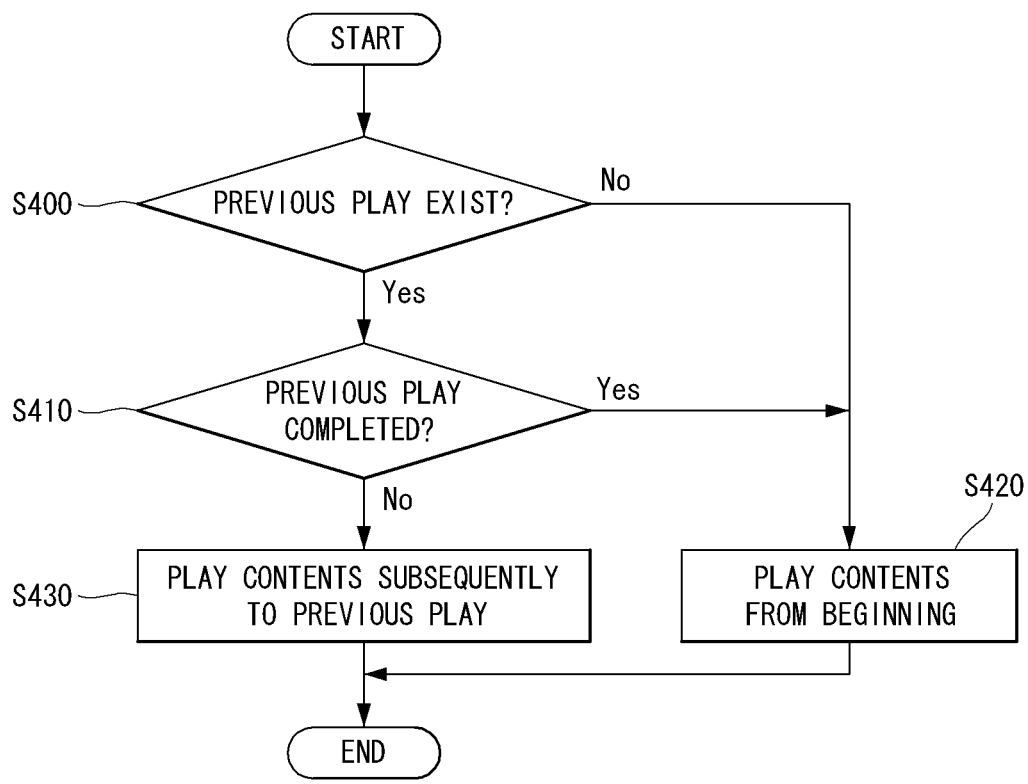
FIG. 18 is a flowchart illustrating a method of controlling an electronic device according to an embodiment of the present invention.

FIG. 18 is a flowchart illustrating a method of controlling an electronic device according to an embodiment of the present invention.

This embodiment may include steps S100 and S110 of FIG. 11. Accordingly, this embodiment may be an example of implementing step S120 of FIG. 11 similarly to the embodiment described with reference to FIGS. 16 and 17.

The method of controlling an electronic device according to this embodiment may be implemented by an electronic device set to perform the function of the DMC 240 among the plurality of electronic devices 10, 11, 12, 13, 100, 101, and 102.

For convenience of description, a method of controlling the first electronic device 10 and an operation of the first electronic device 10 will be described.

The first electronic device 10 may identify play history information on the contents identified in step S110 (the contents previously correspond to the first mobile terminal 100 and/or the first user).

The play history information may be stored in various locations in the DLNA network 200. The play history information may be present in an outside of the DLNA network 200.

The play history information may be stored in the memory of the first electronic device 10 or in a memory of an electronic device performing the function of the DMS 210 in the DLNA network 200. The play history information may be stored in the memory 160 of the first mobile terminal 100.

The play history information may include information on whether the identified contents have been played before and, if so, how many times the contents were played, or whether the contents were completely played during the previous play.

In a case where the contents were not completely played during the previous play, the play history information may include information on where the play of the contents was paused.

The first electronic device 10 may determine whether the identified contents have been played before by referring to the play history information on the identified contents (S400).

If it is determined in step S400 that the contents have been played before, the first electronic device 10 may determine whether the play of the contents were complete (S410).

If it is determined in step S400 that the contents have been never played before or it is determined in step S410 that the contents were completely played during the previous play, the first electronic device 10 may output a control signal enabling the identified contents to be outputted again from beginning (S420).

If it is determined in step S410 that the contents were not completely played during the previous play, the first electronic device 10 may output a control signal enabling the identified contents to be played subsequently to the previous play (S430).

Accordingly, the first user may view the contents he/she received before without the need for separately searching a menu or controlling various electronic devices in the DLNA network 200.

Figure 19:
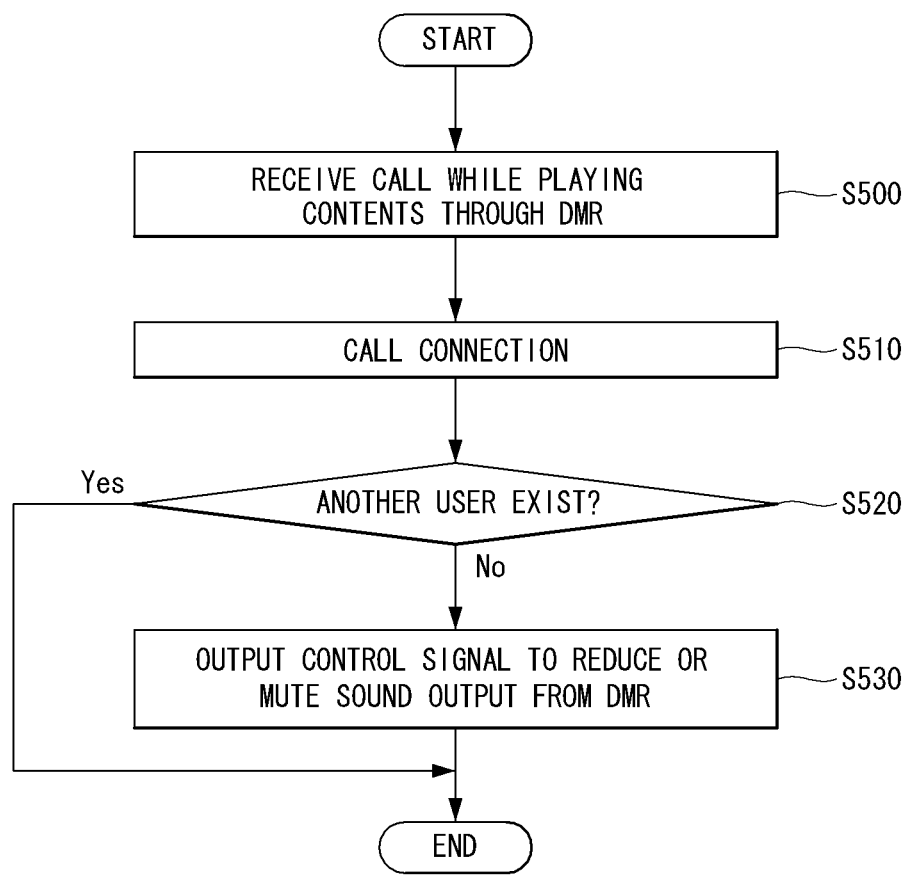
FIG. 19 is a flowchart illustrating a method of controlling an electronic device according to an embodiment of the present invention.

FIG. 19 is a flowchart illustrating a method of controlling an electronic device according to an embodiment of the present invention.

This embodiment may include steps S100 to S120 of FIG. 11. That is, this embodiment may include the embodiment described with respect to FIGS. 11 to 13.

The method of controlling an electronic device according to this embodiment may be implemented by an electronic device set to perform the function of the DMC 240 among the plurality of electronic devices 10, 11, 12, 13, 100, 101, and 102.

For convenience of description, a method of controlling the first electronic device 10 and an operation of the first electronic device 10 will be described.

As the first mobile terminal 100 enters into the DLNA network 200, the first electronic device 10 may output a control signal enabling the preset contents corresponding to the first mobile terminal 100 and/or the first user to be played by a specific DMR included in the DLNA network 200 (see the above embodiments described with reference to FIGS. 11 to 18).

Referring to FIG. 19, the first mobile terminal 100 may receive a call while playing the preset contents by the DMR (S500). The fact that the call was received may be transferred from the first mobile terminal 100 to the first electronic device 10.

The first mobile terminal 100 may make a call connection to the caller automatically or by a first users' operation (S510). The fact that the call connection was made may be transferred from the first mobile terminal 100 to the first electronic device 10.

The first electronic device 10 may determine whether there is a mobile terminal of a user other than the first user (for example, the second mobile terminal 101 or the third mobile terminal 102) in the DLNA network 200 (S520).

If it is determined in step S520 that there is not any other user's mobile phone in the DLNA network 200, the first electronic device 10 may output to the DMR a control signal for reducing or muting the sound output from the DMR playing the contents corresponding to the first user (S530).

If it is determined in step S520 that there is any other user's mobile terminal in the DLNA network 200, the first electronic device 10 may perform no operation to secure his view right.

Figure 20:
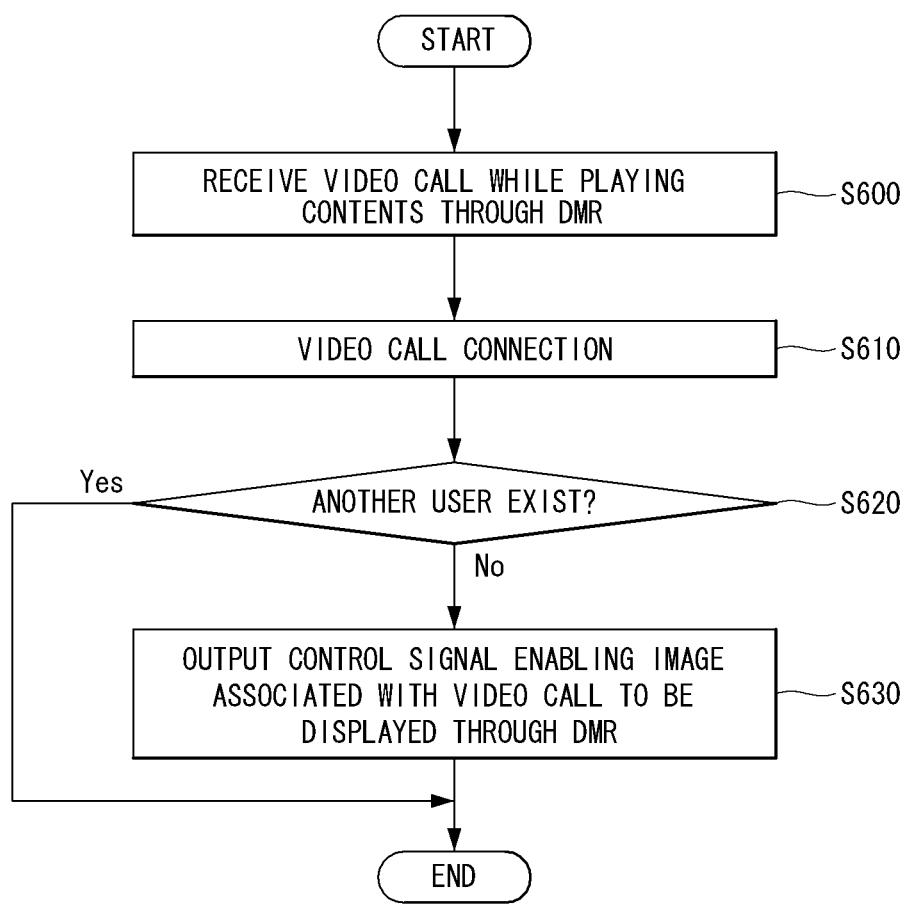
FIG. 20 is a flowchart illustrating a method of controlling an electronic device according to an embodiment of the present invention.

FIG. 20 is a flowchart illustrating a method of controlling an electronic device according to an embodiment of the present invention.

Figure 21:
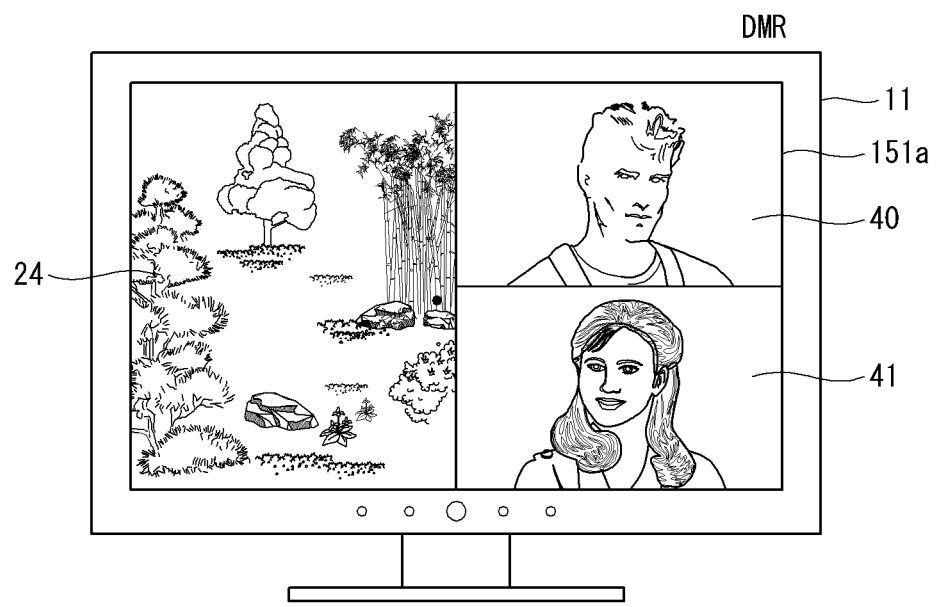
FIGS. 21 and 22 are views illustrating a method of controlling an electronic device according to an embodiment of the present invention.
Figure 22:
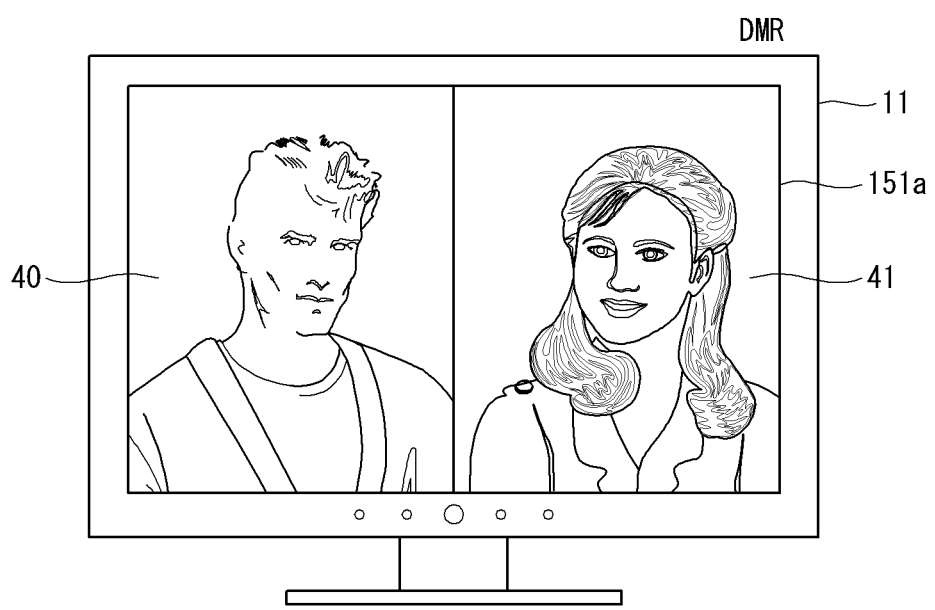

FIGS. 21 and 22 are views illustrating a method of controlling an electronic device according to an embodiment of the present invention.

This embodiment may include steps S100 to S120 of FIG. 11. That is, this embodiment may include the embodiment described with respect to FIGS. 11 to 13.

The method of controlling an electronic device according to this embodiment may be implemented by an electronic device set to perform the function of the DMC 240 among the plurality of electronic devices 10, 11, 12, 13, 100, 101, and 102.

For convenience of description, a method of controlling the first electronic device 10 and an operation of the first electronic device 10 will be described.

Referring to FIG. 20, the first mobile terminal 100 may receive a video call while playing the preset contents by the DMR (S600). The fact that the video call was received may be transferred from the first mobile terminal 100 to the first electronic device 10.

The first mobile terminal 100 may make a video call connection to the caller automatically or by a first user's operation (S610). The fact that the video call connection was made may be transferred from the first mobile terminal 100 to the first electronic device 10.

The first electronic device 10 may determine whether there is a mobile terminal of any other user than the first user (for example, the second mobile terminal 101 or the third mobile terminal 102) in the DLNA network 200 (S620).

If it is determined in step S620 that there is not any other user's mobile terminal in the DLNA network 200, the first electronic device 10 may output to the DMR a control signal enabling an image associated with the video call to be displayed by the DMR playing the contents corresponding to the first user (S630).

The first mobile terminal 100 may transmit the image associated with the video call to the DMR.

In general, while performing a video call through a mobile terminal, an image of a user of the mobile terminal and an image of the other party both are displayed on the screen of the mobile terminal. According to an embodiment, the other party's image and the user's image may be included in the image associated with the video call.

FIGS. 21 and 22 illustrate examples of displaying the image associated with the video call on the DMR.

Referring to FIG. 21, the contents 24 being played, the other party's image 40 and the first user's image 41 transmitted from the first mobile terminal 100 may be displayed on the output window 151a of the second electronic device 11.

Referring to FIG. 22, the other party's image 40 and the first user's image 41 may be only displayed on the output window 151a of the second electronic device 11.

If it is determined in step S620 that there is any other user's mobile terminal in the DLNA network 200, the first electronic device 10 may perform no operation to secure a view right of the user.

Figure 23:
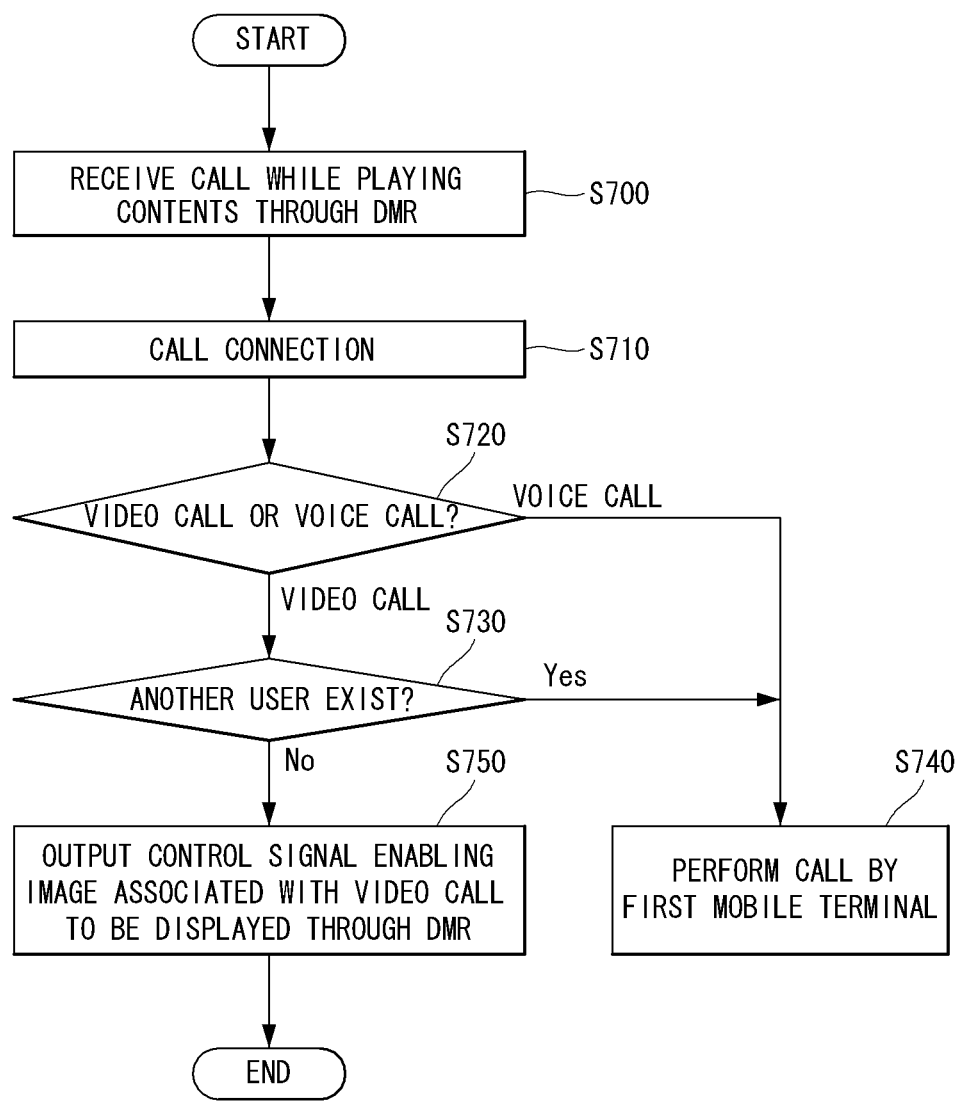
FIG. 23 is a flowchart illustrating a method of controlling an electronic device according to an embodiment of the present invention.

FIG. 23 is a flowchart illustrating a method of controlling an electronic device according to an embodiment of the present invention.

This embodiment may include steps S100 to S120 of FIG. 11. That is, this embodiment may include the embodiment described with respect to FIGS. 11 to 13.

The method of controlling an electronic device according to this embodiment may be implemented by an electronic device set to perform the function of the DMC 240 among the plurality of electronic devices 10, 11, 12, 13, 100, 101, and 102.

For convenience of description, a method of controlling the first electronic device 10 and an operation of the first electronic device 10 will be described.

Referring to FIG. 23, the first mobile terminal 100 may receive a call while playing the preset contents by the DMR (S700). The fact that the call was received may be transferred from the first mobile terminal 100 to the first electronic device 10.

The first mobile terminal 100 may make a call connection to the caller automatically or by a first user's operation (S710). The fact that the call connection was made may be transferred from the first mobile terminal 100 to the first electronic device 10.

The first mobile terminal 100 or the first electronic device 10 may determine whether the received or connected call is a video call or a voice call (S720).

If the received or connected call is a voice call, the first mobile terminal 100 or the first electronic device 10 may enable the first mobile terminal 100 to perform the call (S740).

If the received or connected call is a video call, the first mobile terminal 100 or the first electronic device 10 may determine whether there is any other user's mobile terminal than the first user (for example, the second mobile terminal 101 or the third mobile terminal 102) in the DLNA network 200 (S730).

If it is determined in step S730 that there is any other user's mobile terminal, the first mobile terminal 100 or the first electronic device 10 may perform step S740 to secure the user's view right (S740).

If it is determined in step S730 that there is not any other user's mobile terminal in the DLNA network 200, the first mobile terminal 100 or the first electronic device 10 may output a control signal to the DMR playing the contents corresponding to the first user so that the DMR may display an image associated with the video call (S750).

Figure 24:
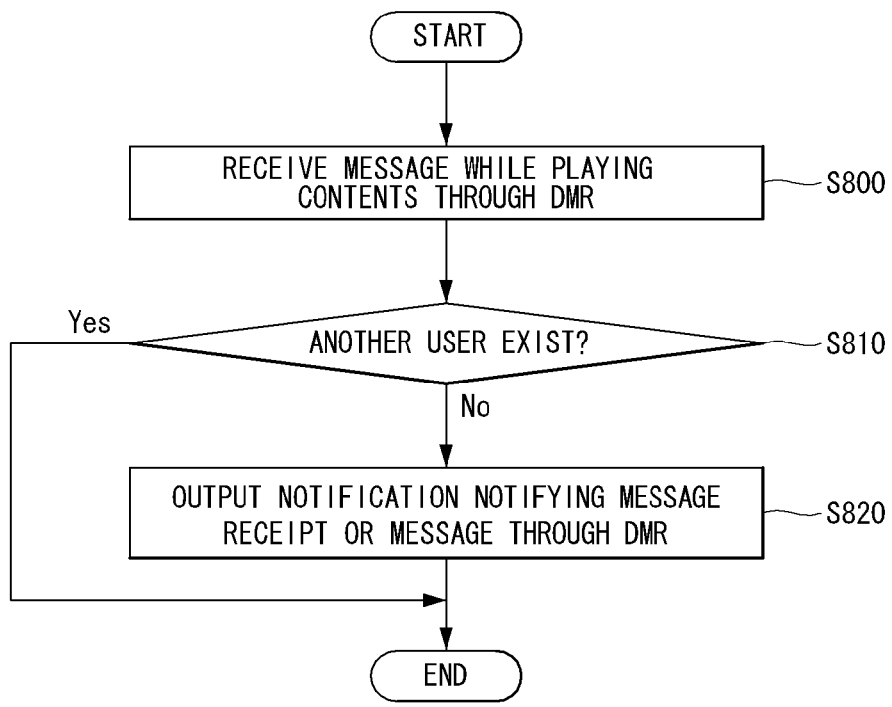
FIG. 24 is a flowchart illustrating a method of controlling an electronic device according to an embodiment of the present invention.

FIG. 24 is a flowchart illustrating a method of controlling an electronic device according to an embodiment of the present invention.

Figure 25:
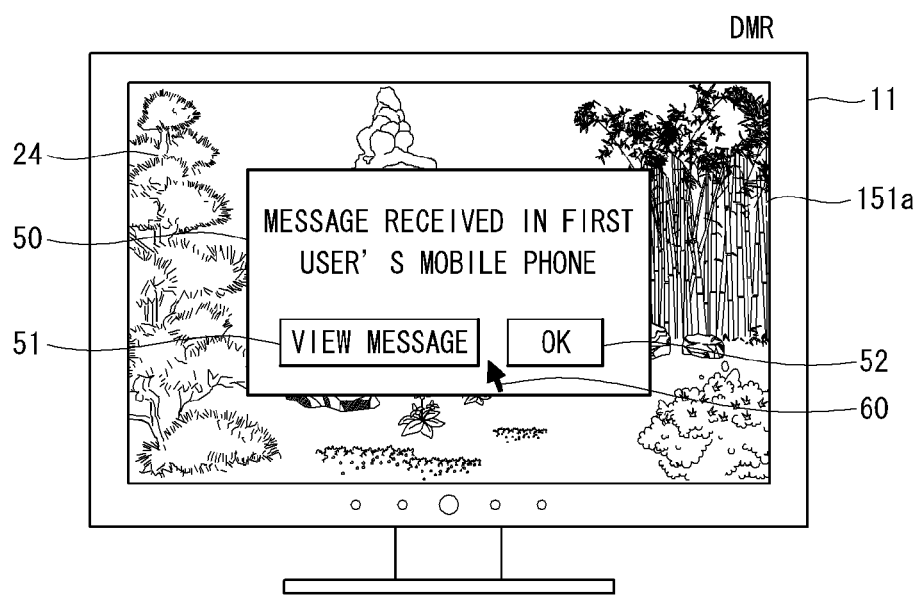
FIGS. 25 and 26 are views illustrating a method of controlling an electronic device according to an embodiment of the present invention.
Figure 26:
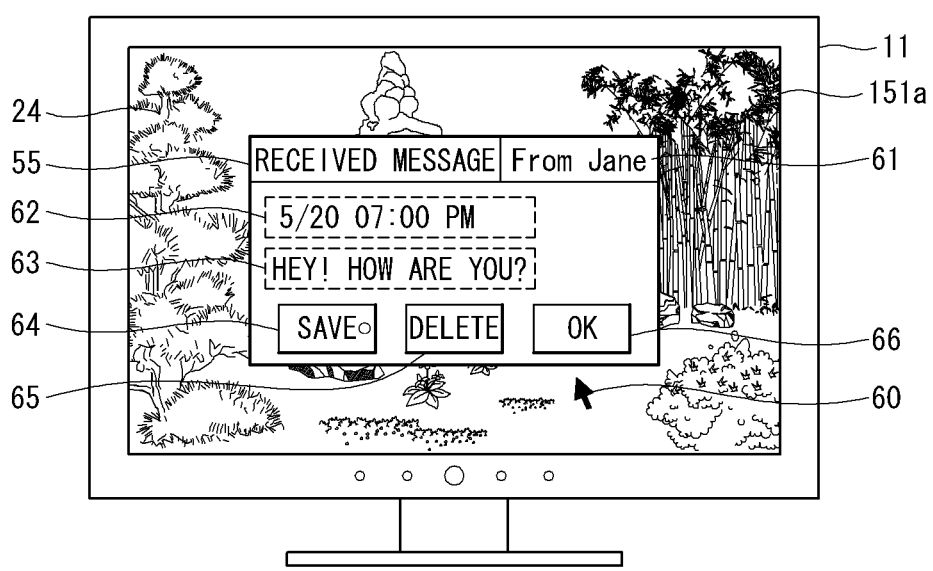

FIGS. 25 and 26 are views illustrating a method of controlling an electronic device according to an embodiment of the present invention.

This embodiment may include steps S100 to S120 of FIG. 11. That is, this embodiment may include the embodiment described with respect to FIGS. 11 to 13.

The method of controlling an electronic device according to this embodiment may be implemented by an electronic device set to perform the function of the DMC 240 among the plurality of electronic devices 10, 11, 12, 13, 100, 101, and 102.

For convenience of description, a method of controlling the first electronic device 10 and an operation of the first electronic device 10 will be described.

Referring to FIG. 24, the first mobile terminal 100 may receive a message among the preset contents through the DMR (S800).

The message may include at least one of a SMS (Short Message Service) message, an MMS (Multimedia Messaging Service) message, an IM (Instant Message), and an email.

The fact that the message was received may be transferred from the first mobile terminal 100 to the first electronic device 10.

The first electronic device 10 may determine whether there is any other user's mobile terminal than the first user (for example, the second mobile terminal 101 or the third mobile terminal 102) in the DLNA network 200 (S810).

If it is determined in step S810 that there is not any other user's mobile terminal in the DLNA network 200, the first electronic device 10 may output to the DMR playing the contents corresponding to the first user notification information notifying the DMR that the message was received or a control signal enabling the message to be outputted (S820).

For example, referring to FIG. 25, the second electronic device 11 performing the function of the DMR may receive the message receipt fact from the first electronic device 10 and/or the first mobile terminal 100 of the first user and may display a first window notifying the message receipt fact on the output window 151a.

The first window 50 may include the message receipt fact and icons 51 and 52 corresponding to specific functions.

The first user may control a cursor 60 displayed on the output window 151a using a control device to select the icons 51 and 52.

The first icon 51 corresponds to a function of outputting the received message, and the second icon 52 corresponds to a function of making the first window disappear from the screen.

Referring to FIG. 26, a second window 55 including the message received by the first mobile terminal 100 may be displayed on the output window 151a.

As shown in FIG. 26, the second window 55 may include information on the message sender 61, receipt time of the message 62, content of the message 63, etc.

The second window 55 may include various icons 64, 65, and 66.

Among the icons 64, 65, and 66, the third icon 64 corresponds to a function of storing the received message. When the first user controls the cursor 60 to select the third icon 64, the received message may be stored in the memory of the first electronic device 10 and/or the memory 160 of the first mobile terminal 100.

The fourth icon 65 corresponds to a function of deleting the received message, and the fifth icon 66 corresponds to a function of making the second window 55 disappear from the screen.

If it is determined in step S810 that there is any other user's mobile terminal, the first electronic device 10 may perform no operation to secure his view right or first user's privacy.

The method of controlling an electronic device according to the embodiments described with reference to FIGS. 19 to 26 may also be implemented by the first mobile terminal 100.

Although it has been mainly described in the above embodiments that the first mobile terminal 100 enters into the DLNA network 200, the present invention is not limited thereto.

For example, when the first mobile terminal 100 comes out of the DLNA network 200, the electronic device performing the function of the DMC 240 may automatically detect it, and if there exists the DMR 230 playing the preset contents for the first mobile terminal 100, may output a control signal for pausing the play of the contents.

The method of controlling an electronic device may be written as computer programs and may be implemented in digital microprocessors that execute the programs using a computer readable recording medium.

The method of controlling an electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. An electronic device, comprising:
   a communication unit configured to connect the electronic device to a network; and
   a controller configured to automatically output a control signal related to a first mobile terminal when the first mobile terminal enters into the network, wherein the control signal is configured to cause preset content corresponding to the first mobile terminal to be output by a second electronic device included in the network,
   wherein the second electronic device includes a Digital Media Renderer (DMR),
   wherein the communication unit comprises a first module configured to perform a call function, and
   wherein the controller is further configured to:
      output a control signal to cause reducing or muting of a sound output from the second electronic device in response to receiving a call through the first module when no second mobile terminal is included in the network; and
      cause maintaining of a level of the sound output from the second electronic device in response to receiving the call through the first module when the second mobile terminal is included in the network.

2. The electronic device of claim 1, wherein:
   the network is a Digital Living Network Appliance (DLNA) network.

3. The electronic device of claim 1, wherein:
   the preset content is stored in a Digital Media Server (DMS) included in the network; and
   the DMS includes the first mobile terminal.

4. The electronic device of claim 3, wherein:
   the preset content is preset based on a first group of a plurality of groups; and
   the first group is based on at least one criterion.

5. The electronic device of claim 1, wherein:
   the preset content includes a broadcast program received by the second electronic device through a preference broadcast channel associated with the first mobile terminal when the second electronic device supports receiving a broadcast signal.

6. The electronic device of claim 1, wherein:
   the second mobile terminal is included in the network; and
   the controller is further configured to output the control signal when the second electronic device is preset for receiving control signals related to the second mobile terminal and the first mobile terminal has a higher priority than the second mobile terminal.

7. The electronic device of claim 1, wherein:
the network includes a plurality of DMRs;
a first DMR of the plurality of DMRs is assigned to output content related to the first mobile terminal; and
the control signal is configured to cause the first DMR to output the preset content.

8. The electronic device of claim 7, wherein:
the second mobile terminal is included in the network;
the first DMR of the plurality of DMRs is assigned to output content related to the second mobile terminal;
the first mobile terminal has a lower priority than the second mobile terminal; and
the control signal is further configured to cause a second DMR separate from the first DMR to output the preset content while the first DMR continues to output the content related to the second mobile terminal.

9. The electronic device of claim 1, wherein the controller is further configured to:
determine whether the preset content was completely played during a previous output of the present content based on play history information; and
output the control signal to cause output of the preset content from a point at which the output of the preset content ended during the previous output.

10. The electronic device of claim 1, wherein:
the communication unit further comprises a second module configured to perform a video call function; and
the controller is further configured to output a control signal to cause an image associated with the video call to be displayed via the second device when the video call is performed.

11. The electronic device of claim 1, wherein:
the communication unit further comprises a third module configured to perform a message transmittance/receipt function; and
the controller is further configured to output a control signal to the second electronic device upon receipt of the message via the third module to cause the message to be transmitted to the second electronic device or to cause notification information related to receipt of the message to be transmitted to the second electronic device to enable the second electronic device to output the message.

12. The electronic device of claim 1, wherein:
the controller is further configured to output the control signal only when the first mobile terminal is the only mobile terminal included in the network.

13. The electronic device of claim 1, wherein:
the electronic device is configured to perform a Digital Media Controller (DMC) function in the network.

14. A method of controlling an electronic device included in a network, the method comprising:
connecting the electronic device to the network;
automatically outputting a control signal related to a first mobile terminal when the first mobile terminal enters into the network;
causing preset content corresponding to the first mobile terminal to be output by a second electronic device included in the network in response to the control signal, wherein the second electronic device is configured to perform as a Digital Media Renderer (DMR) and comprises a first module configured to perform a call function;
outputting a control signal for reducing or muting a sound output from the second electronic device in response to receiving a call through the first module when no second mobile terminal is included in the network; and
causing maintaining of a level of the sound output from the second electronic device in response to receiving the call through the first module when the second mobile terminal is included in the network.

15. The method of claim 14, wherein:
the network is a Digital Living Network Appliance (DLNA) network.

* * * * *